(12) United States Patent
Tanahashi

(10) Patent No.: US 9,071,114 B2
(45) Date of Patent: Jun. 30, 2015

(54) COIL CORRECTION METHOD

(75) Inventor: Yu Tanahashi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/119,956

(22) PCT Filed: May 26, 2011

(86) PCT No.: PCT/JP2011/062068
§ 371 (c)(1),
(2), (4) Date: Nov. 25, 2013

(87) PCT Pub. No.: WO2012/160689
PCT Pub. Date: Nov. 29, 2012

(65) Prior Publication Data
US 2014/0208583 A1      Jul. 31, 2014

(51) Int. Cl.
*H01F 41/06* (2006.01)
*H02K 15/04* (2006.01)

(52) U.S. Cl.
CPC .............. *H02K 15/04* (2013.01); *Y10T 29/532* (2015.01); *Y10T 29/4902* (2015.01); *H02K 15/045* (2013.01)

(58) Field of Classification Search
CPC ................................ H01J 9/236; H01J 29/702
USPC ........ 29/596–598, 732–736, 592.1, 605–606, 29/564.4–564.6; 310/254.1, 208; 335/210, 335/213, 215
See application file for complete search history.

(56) References Cited

U.S. PATENT DOCUMENTS

| | | | | |
|---|---|---|---|---|
| 5,111,173 A * | 5/1992 | Matsuda et al. | | 335/216 |
| 5,461,773 A * | 10/1995 | Kawaguchi | | 29/605 |
| 2012/0086298 A1 | 4/2012 | Fubuki et al. | | |
| 2012/0223611 A1 | 9/2012 | Watanabe et al. | | |
| 2014/0208583 A1 * | 7/2014 | Tanahashi | | 29/602.1 |

FOREIGN PATENT DOCUMENTS

| | | |
|---|---|---|
| JP | 2005-085560 A | 3/2005 |
| JP | 2006-020490 A | 1/2006 |
| JP | 2011-199098 A | 10/2011 |
| WO | 2011/001736 A1 | 1/2011 |
| WO | 2011/055438 A1 | 5/2011 |

* cited by examiner

*Primary Examiner* — Minh Trinh
(74) *Attorney, Agent, or Firm* — Kenyon & Kenyon LLP

(57) ABSTRACT

In a method for correcting a coil wound in two layers, the coil is corrected as follows: a conductor is wound from an outside layer toward an inside layer to form a first row; the conductor is wound from the inside layer toward the outside layer to form a second row; the conductor is wound from the outside layer toward the inside layer to form a third row; a crossover portion is formed by connecting adjacent rows of the conductor; and a load is applied to the crossover portion from a coil correcting die through a crossover-portion correcting die so as to push first and second ends of the crossover portion along adjacent rows and move an intermediate portion of the crossover portion to an adjacent row.

19 Claims, 23 Drawing Sheets

COIL CORRECTION METHOD

CROSS-REFERENCE TO RELATED APPLICATIONS

This is a national phase application based on the PCT International Patent Application No. PCT/JP2011/062068 filed on May 26, 2011, the entire contents of which are incorporated herein by reference.

TECHNICAL FIELD

The present invention relates to a technique of shaping a coil to be wound in a stator for use in a motor and more particularly to a method for correcting a coil made of a flat conductor wound in two layers that are inside and outside layers, and a mechanism or apparatus for correcting the coil.

BACKGROUND ART

Of motors to be mounted in vehicles, a motor to be used for driving a vehicle is demanded for compact size and high output power. Therefore, it has been studied to form a coil of a flat conductor having a rectangular cross section effective in increasing a lamination factor. When a coil is to be formed of such a flat conductor, however, the flat conductor having a large cross sectional area is hard to be wound into a coil shape. Further, the flat conductor having a large cross sectional area can increase current density, but may cause a problem with eddy current. Accordingly, various studies have been made to form a coil by winding a flat conductor.

Patent Document 1 discloses a litz wire coil formed of a rectangular litz wire wound to be vertically stacked in an axial direction to be wound in two layers, forming in turn an outside layer, an inside layer, an inside layer, and an outside layer.

RELATED ART DOCUMENTS

Patent Documents

Patent Document 1: JP-A-2005-085560

SUMMARY OF INVENTION

Problems to be Solved by the Invention

However, the litz wire coil in Patent Document 1 has the following problems. Herein, FIG. 21 is a schematic view showing the order of forming a first row of the litz wire coil in Patent Document 1 and FIG. 22 is a schematic view showing the order of forming a second row of the litz wire coil in Patent Document 1.

In a litz wire coil 200 in Patent Document 1, as shown in FIGS. 21 and 22, assuming that the sides of a rectangular litz wire 202 are referred to as a side A, a side B, a side C, and a side D in a winding order, the rectangular litz wire 202 starts to be wound from the side A of a second layer (outer side) and then forms the side B, the side C, and the side D of the second layer, shifts to the side A of a first layer (inner side). Thereafter, the wire is wound to form the side B and side C of the first layer (inner side) and shifts to the side D. On the side D of the first layer, a crossover portion shifting from the first row to the second row.

The wire is then wound from the side A of the second row and forms the sides B and C of the first layer and the side D of the second layer, and then shifts to the side A of the second layer. A winding manner after forming the sides B and C of the second layer is problematic. In the second row, the side D of the second layer has been already wound, the litz wire coil 200 to be wound in two layers has to form a crossover portion on the side C of the second layer to cross over to the third row. However, the side A and the side C of the rectangular litz wire 202 need to be accommodated in slots (not shown) of a stator (not shown). Thus, if the crossover portion is formed on the side C, the lamination factor of the slots is decreased. Specifically, according to the method shown in Patent Document 1, even if the litz wire coil 200 is formed by winding the rectangular litz wire 202 in two layers, it is difficult to contribute to an increase in lamination factor of the stator.

It is therefore conceivable to form a coil 20 by winding a flat conductor 10 as shown in FIG. 23. This coil 20 is a two-layer winding edgewise coil made of the flat conductor 10 wound in two layers, that is, inside and outside layers. For a first row, the flat conductor 10 is wound from the outside layer toward the inside layer. For a second row, the flat conductor 10 is wound from the inside layer toward the outside layer. For a third row, the flat conductor 10 is wound from the outside layer toward the inside layer. For a fourth row, the flat conductor 10 is wound from the inside layer toward the outside layer. It is to be noted that the fifth and subsequent rows are omitted in FIG. 23 for convenience of explanation, but the fifth and subsequent rows are also formed by similarly winding the flat conductor 10.

The coil 20 having a coil end 22 and a coil end 24 present on both sides is formed, on the one coil end 22 side, an inside layer-change line 26 (a crossover portion) to bridge between the first row and the second row adjacent thereto, an outside layer-change line 28 (a crossover portion) to bridge between the second row and the third row adjacent thereto, and an inside layer-change line 26 to bridge between the third row and the fourth row adjacent thereto. According to this coil 20, the inside layer-change lines 26 and the outside layer-change lined 28 are not located in portions to be accommodated in slots of a stator, so that the stator can have a high lamination factor. The coil ends 22 and 24 correspond to portions to be located on the end faces of the stator in its axial direction when the coil 20 is mounted in the stator (not shown) of a motor.

When the above coil 20 is to be formed, the flat conductor 10 is bent 90° about a supporting point on the same plane. However, this simply bending may cause the inside layer-change lines 26 and the outside layer-change lined 28 to bulge or protrude in a spring form as shown in FIGS. 24 and 25. This results in an increased lamination thickness (product thickness) of a coil, which may inhibit improvement of the lamination factor of the stator.

Therefore, as a conventional manner to correct the shape of the above coil 20, a load is applied to the coil 20 in a direction to which the first row, second row, and third row are arranged (a right-and-left direction in FIG. 23, hereinafter, simply referred to as an "arrangement direction") to reduce the thickness of the coil 20 in the arrangement direction (hereinafter, referred to as a "lamination thickness"). However, according to such a simply correcting manner performed by clamping the coil 20 from above and below in the lamination thickness direction to apply the load thereto, the inside layer-change lines 26 and the outside layer-change lines 28 may be undulated or rolled, resulting in unstable shapes, due to the absence of the flat conductor 10 above and below the inside layer-change lines 26 and the outside layer-change lines 28. Thus, the inside layer-change lines 26 and the outside layer-change lines 28 could not be bent and the coil 20 remains inclined. This may increase the lamination thickness of the coil 20.

Furthermore, if an excessive load is applied to the coil 20 to form the coil 20 having an ideal lamination thickness for improvement of the lamination factor of a stator, an insulation coating or film of the flat conductor 10 could not be maintained, leading to deterioration of insulation.

The present invention has a purpose to provide a coil correction method and a coil correction mechanism capable of correcting a lamination thickness of a coil wound in two layers to an ideal thickness.

Means of Solving the Problems

To achieve the above purpose, one aspect of the invention provides a method for correcting a coil made of a conductor wound in two layers that are an inside layer and an outside layer, wherein the coil includes a first row formed of the conductor wound from the outside layer toward the inside layer, a second row formed of the conductor wound from the inside layer toward the outside layer, a third row of the conductor wound from the outside layer toward the inside layer, and crossover portions of the conductor connecting the adjacent rows, and wherein the method uses a coil correcting die configured to apply a load to the coil in an arrangement direction of the first row, the second row, and the third row, to correct the coil, the method includes: clamping the crossover portions by crossover-portion correcting dies placed on both sides of each crossover portion in the arrangement direction; applying the load to the crossover portions by the coil correcting die through the crossover-portion correcting dies to make a first end portion and a second end portion of each crossover portion extend along the adjacent rows, and make an intermediate portion between the first end portion and the second end portion extend to shift to the adjacent rows.

According to the above aspect, the shape of the crossover portions are stable after the coil is corrected. This can reduce the inclination which is generated in the crossover portion extending from the first to second rows of the coil and the crossover portion extending from the second to third rows. Therefore, the lamination thickness of the coil can be reduced and thus the coil with the ideal lamination thickness can be produced.

Furthermore, since it is possible to intensively apply a load from the crossover-portion correcting dies to the crossover portions through the use of the load from the coil correcting die, the load to be applied from the coil correcting die can be largely reduced. Therefore, the insulation layer coating the conductor can be maintained after the coil is corrected and thus an insulation property of the coil can be ensured.

In the above configuration, preferably, the crossover-portion correcting dies are disposed in positions on both sides of each crossover portion in the arrangement direction in sync with movement of the coil correcting die in applying the load.

According to the above configuration, it is possible to utilize the load applying motion of the coil correcting die. This can achieve power saving in correcting the coil.

In the above configuration, preferably, each of the crossover-portion correcting dies includes a thick wall portion and a thin wall portion, the thin wall portion has a thickness equal to a thickness of a part of each crossover portion to be applied with the load when the load is applied, and the thick wall portion has a thickness double the thickness of the thin wall portion.

According to this configuration, the thickness of each of the crossover-portion correcting die is determined in expectation of an amount of the conductor to be warped when the coil receives the load. Thus, the crossover-portion correcting dies can reliably apply the load to the crossover portions.

In the above configuration, preferably, the crossover-portion correcting dies are mounted on a movable part that is movable forward and backward with respect to the crossover portions, and when the movable part is moved forward with respect to the crossover portions, the crossover-portion correcting dies are disposed on both sides of each crossover portion in the arrangement direction.

According to this configuration, the crossover-portion correcting dies can be disposed at once on both sides of each crossover portion in the arrangement direction. Further, the movable part is moved forward with respect to the crossover portions in sync with the load applying movement of the coil correcting dies. This can achieve power saving in moving the plurality of crossover-portion correcting dies.

In the above configuration, preferably, the crossover portions include an outside crossover portion formed of the conductor connecting the second row and the third row, and the crossover-portion correcting dies clamp the first end portion and the second end portion of the outside crossover portion.

According to this configuration, the shape of the outside crossover portion is stable after the coil is corrected. Thus, the lamination thickness of the coil can be reduced and hence the coil with an ideal lamination thickness can be produced.

In the above configuration, preferably, the crossover portions include an inside crossover portion of the conductor connecting the first row and the second row, and the crossover-portion correcting dies clamp an intermediate portion between the first end portion and the second end portion of the inside crossover portion.

According to this configuration, the shape of the inside crossover portion is stable after the coil is corrected. Thus, the lamination thickness of the coil can be reduced and hence the coil with an ideal lamination thickness can be produced.

In the above configuration, preferably, the crossover portions include an inside crossover portion of the conductor connecting the first row and the second row and an outside crossover portion of the conductor connecting the second row and the third row, and the crossover-portion correcting dies clamp an intermediate portion between the first end portion and the second end portion of the inside crossover portion and clamp the first end portion and the second end portion of the outside crossover portion.

According to this configuration, the shape of the inside crossover portion and the shape of the outside crossover portion are stable after the coil is corrected. Thus, the lamination thickness of the coil can be effectively reduced and hence the coil with an ideal lamination thickness can be more reliably produced.

Another aspect of the invention to achieve the above purpose provides a mechanism for correcting a coil made of a conductor wound in two layers that are an inside layer and an outside layer, wherein the coil includes a first row formed of the conductor wound from the outside layer toward the inside layer, a second row formed of the conductor wound from the inside layer toward the outside layer, a third row of the conductor wound from the outside layer toward the inside layer, and crossover portions of the conductor connecting the adjacent rows, and the mechanism includes: a coil correcting die for applying a load to the coil in an arrangement direction of the first row, the second row, and the third row, to correct the coil; and crossover-portion correcting dies to be placed on both sides of each crossover portion in the arrangement direction, and the mechanism is configured to clamp the crossover portions by the crossover-portion correcting dies when the coil is to be corrected by the coil correcting die, apply the load to the crossover portions from the coil correcting die through the crossover-portion correcting dies to make a first end portion and a second end portion of each crossover portion extend along the adjacent rows, and an intermediate portion between the first end portion and the second end portion extend to shift to the adjacent rows.

According to this configuration, the shape of the crossover portions is stable after the coil is corrected. Accordingly, the inclination which is generated in the crossover portion extending from the first row to the second row of the coil and in the crossover portion extending from the second row to the third row can be reduced. Thus, the lamination thickness of the coil can be reduced and hence the coil with an ideal lamination thickness can be produced.

Since it is possible to intensively apply a load from the crossover-portion correcting dies to the crossover portions through the use of the load applied from the coil correcting die, the load to be applied from the coil correcting die can be largely reduced. Therefore, the insulation layer coating conductor can be maintained and thus the insulation property of the coil can be ensured.

Effects of the Invention

According to the correction method and the correction mechanism of the invention, a coil wound in two layers can be corrected to an ideal lamination thickness.

MODE FOR CARRYING OUT THE INVENTION

A detailed description of a preferred embodiment of the present invention will now be given referring to the accompanying drawings.

First Example

Structure of Correction Mechanism

Figure 1:
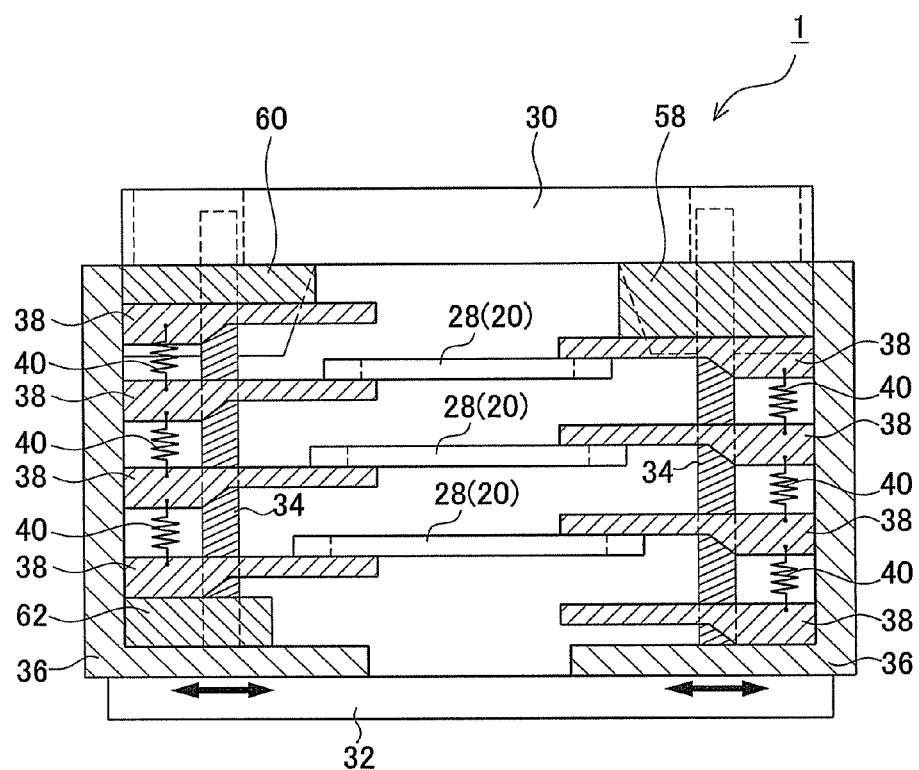
FIG. 1 is a front view of a coil correction mechanism of a first example.
Figure 2:
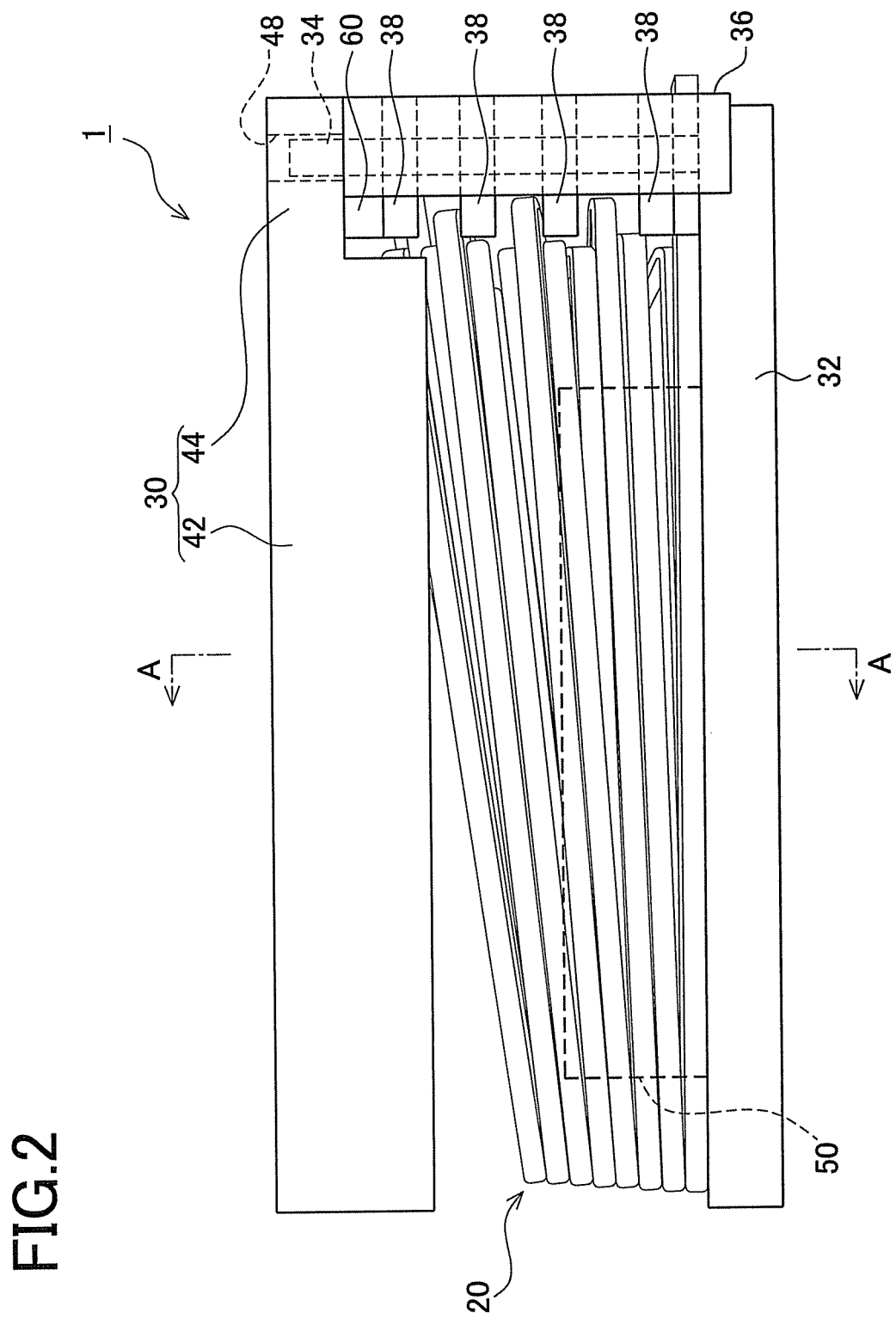
FIG. 2 is a side view of the coil correction mechanism of the first example.
Figure 3:
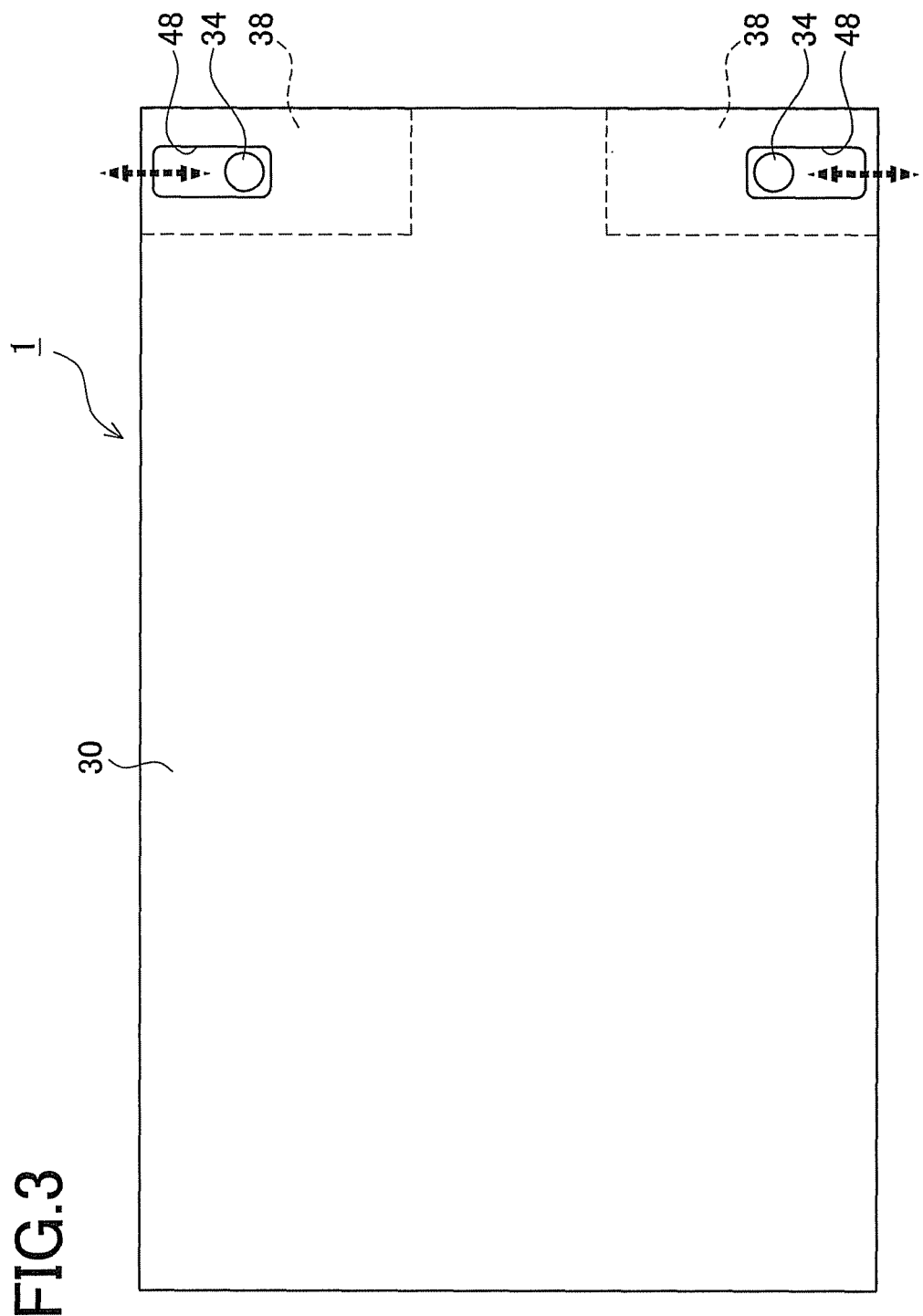
FIG. 3 is a top view (a partially transparent view) of the coil correction mechanism of the first example.
Figure 7:
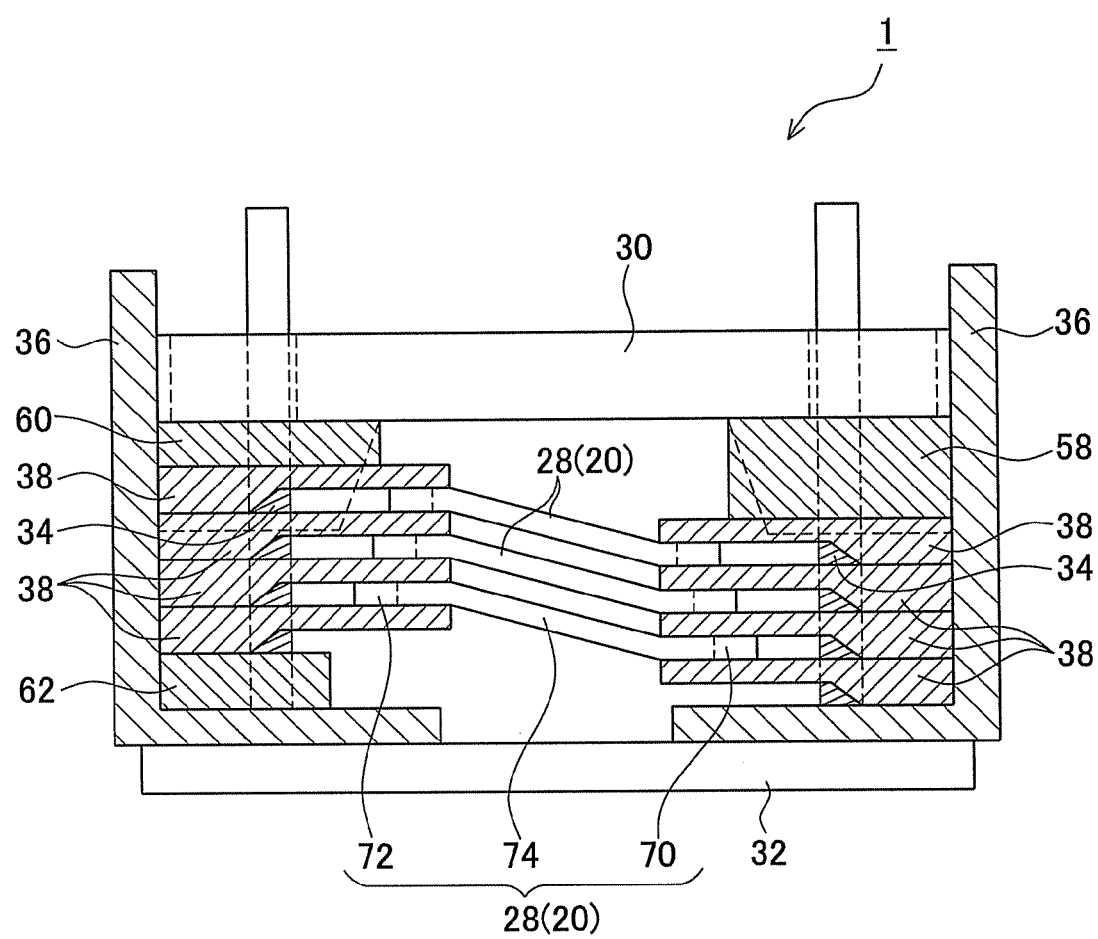
FIG. 7 is a front view of the coil correction mechanism of the first example after completion of crank shaping.

A structure of a coil correction mechanism to be used in the present example will be explained first. Herein, FIG. 1 is a front view of a coil correction mechanism of the first example. FIG. 2 is a side view of the coil correction mechanism of the first example. FIG. 3 is a top view (a partially transparent view) of the coil correction mechanism of the first embodiment. As shown in FIGS. 1 and 2, the correction mechanism 1 includes an upper die 30, a lower die 32, shafts 34, slide bases 36, crank dies 38, and springs 40, and others. In FIGS. 1 and 7 described later, for convenience of explanation, only outside layer-change lines 28 of the coil 20 are illustrated.

The upper die 30 is placed in an uppermost position of the correction mechanism 1 as shown in FIG. 1 and includes a first portion 42 formed as a thick wall and a second portion 44 formed as a thin wall as shown in FIG. 2. This upper die 30 is designed to be rectangular as shown in FIG. 3 when seen from above. The first portion 42 makes up most of the upper die 30 in a longitudinal direction (a right-and-left direction in FIG. 2) and a second portion 44 makes up one end portion of the upper die 30 in the longitudinal direction.

Figure 4:
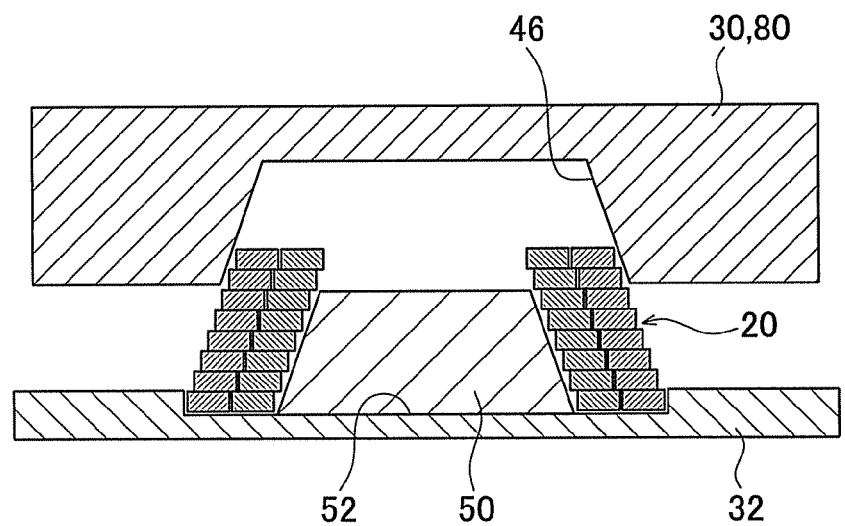
FIG. 4 is a cross sectional view taken along a line A-A in FIG. 2.
Figure 24:
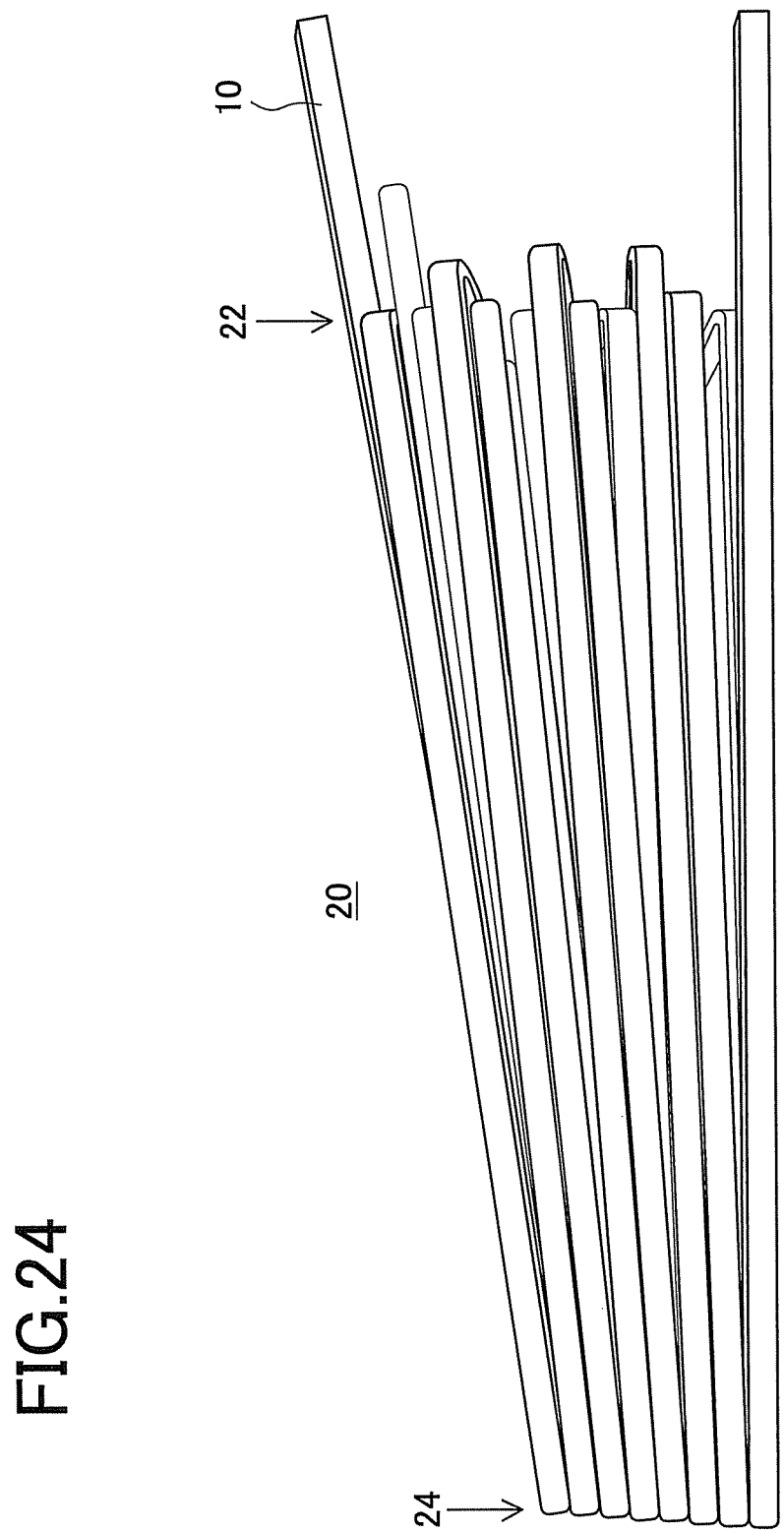
FIG. 24 is a view to explain that the lamination thickness of a coil is increased.
Figure 25:
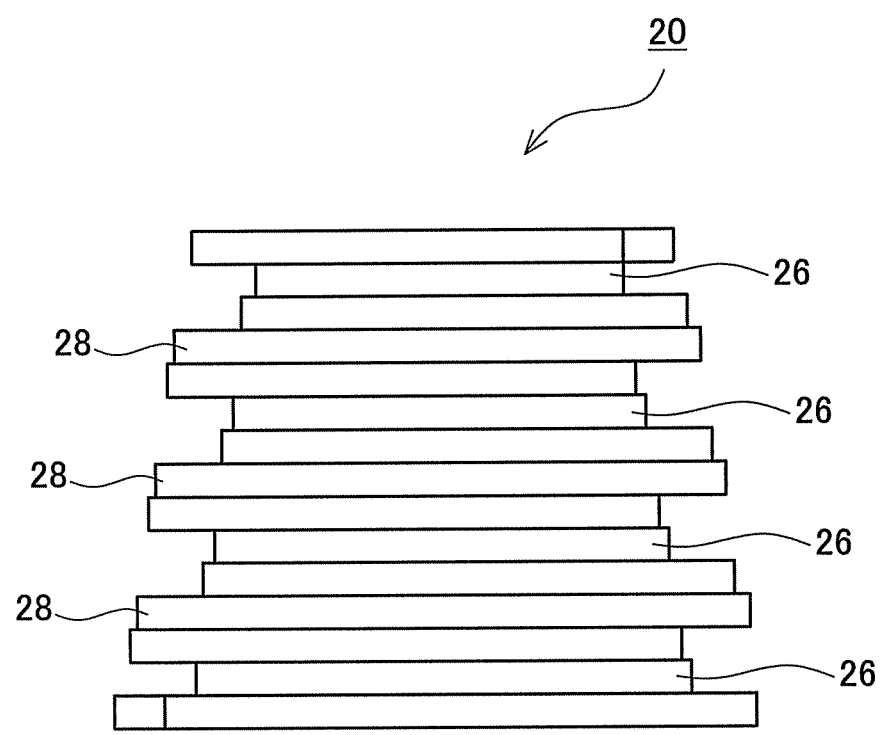
FIG. 25 is a view to explain that the lamination thickness of the coil is increased.

The upper die 30 is provided with a recess 46 at a center area of the cross section of the first portion 42 in a short-side direction (a right-and-left direction in FIG. 1). As shown in FIG. 4, this recess 46 is formed with an outer shape having a trapezoidal shape whose width is gradually decreased toward an upper side in the figure. By inserting the coil 20 (see FIG. 24) in this recess 46, the shape of the coil 20 is corrected to reduce the lamination thickness of the coil 20. Furthermore, as shown in FIG. 3, the second portion 44 is provided with holes 48 each opening to extend in a short side direction of the upper die 30. FIG. 4 is a cross sectional view taken along a line A-A in FIG. 2.

The lower die 32 is provided to be paired with the upper die 30 in an up-and-down direction in the figure as shown in the FIGS. 1 and 2. This lower die 32 is designed to be rectangular when seen from bottom. The lower die 32 is provided, at its center area in cross section in the short side direction (a right-and-left direction in FIG. 1), with an insert block 50 and a recess 52 as shown in FIG. 4. The insert block 50 is formed to protrude from the bottom of the recess 52 toward a side in which the upper die 30 is placed.

This insert block 50 has a trapezoidal outer shape whose width is gradually decreased toward the side in which the upper die 30 is placed. The reason why the insert block 50 is designed to be trapezoidal in outer shape is that a teeth part (not illustrated) of a stator (not shown) to which the finished coil 20 is to be mounted is formed with a trapezoidal outer shape.

The recess 52 is provided in a position facing the recess 46 of the upper die 30 so that the coil 20 is enclosed in the space defined by the recess 46 of the upper die 30 and the recess 52 of the lower die 32. This makes it possible to correct the shape of the coil 20 by reducing the lamination thickness of the coil 20. The paired upper die 30 and lower die 32 are one example of a "coil correcting die" of the present invention.

The slide bases 36 are provided in positions under the second portion 44 of the upper die 30 as shown in FIG. 2. Each slide base 36 is formed in an L shape as shown in FIG. 1 when the correction mechanism 1 is seen from front. The slide bases 36 are provided one each on right and left sides as shown in FIG. 1. Furthermore, the slide bases 36 are moved (in the right-and-left direction in FIG. 1) by a synchronizing means mentioned later to go forward or backward with respect to the upper die 30 and the lower die 32 in sync with movement of the upper die 30. Thus, the crank dies 38 are allowed to move forward or backward with respect to the outside layer-change lines 28 of the coil 20 placed around the insert block 50 as described later. The slide bases 36 are one example of a "movable part" of the invention.

Each of the shafts 34 is formed integral with the corresponding one of the slide bases 36 and has an end portion, on the upper die 30 side, inserted in the corresponding one of the holes 48 formed in the second portion 44 of the upper die 30. The shafts 34 are arranged one each on the right and left sides as shown in FIG. 1.

Figure 5:
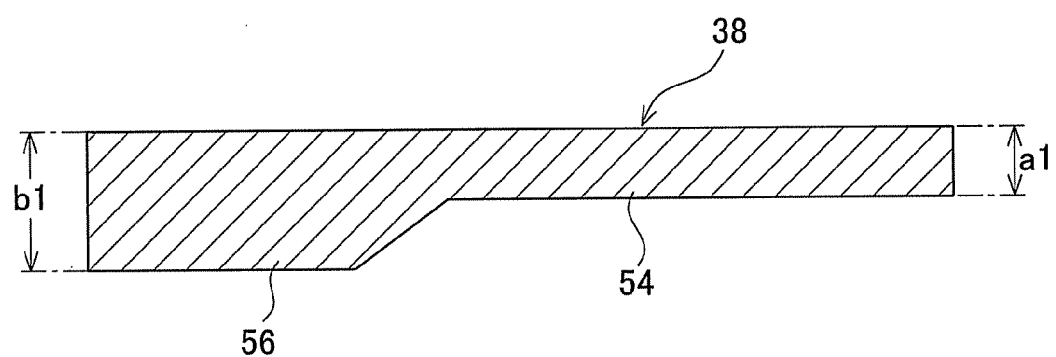
FIG. 5 is a front view of a crank die of the first example.

The crank dies 38 are arranged two or more, e.g., four on each of the right and left sides in the example shown in FIG. 1, on the slide bases 36 and between the second portion 44 of the upper die 30 and the lower die 32 as shown in FIG. 2. Each of the crank dies 38 includes a thin wall portion 54 having a small thickness and a thick wall portion 56 having a large thickness as shown in FIG. 5 and is arranged so that the shaft 34 extends through each crank die 38. The crank dies 38 are movable in the up-and-down direction (i.e., toward the sides in which the upper die 30 and the lower die 32 are placed) in FIGS. 1 and 2 and are integral with the corresponding shafts 34 and slide bases 36. Between the crank dies 38, springs 40 are provided to urge the crank dies 38 in the up-and-down direction in FIGS. 1 and 2. It is to be noted the crank dies 38 are one example of a "crossover-portion correcting die" of the invention.

Further, a spacer 58 and a spacer 60 are placed between the upper die 30 and the uppermost crank dies 38 (placed closest to the upper die 30). A spacer 62 is placed between the lower die 32 and the lowermost crank die 38 on the left side in FIG. 1 (placed closest to the lower die 32). The spacers 58, 60, and 62 are designed to have an appropriate thickness for the specifications of the coil 20 to be formed. Accordingly, the magnitude of a load to be applied to the coil 20 can be adjusted, so that any coils 20 of various specifications can be corrected and shaped by the correction mechanism 1.

(Coil Correcting Method)

A method for correcting the coil 20 using the correction mechanism 1 configured as above will be explained below. The coil 20 is first set in the lower die 32 so that the insert block 50 of the lower die 32 is inserted in the coil 20, and then the upper die 30 is moved downward toward the lower die 32. In sync with the downward moving of the upper die 30, the right and left slide bases 36 are moved toward the coil 20. Accordingly, as shown in FIG. 1, the four right and left crank dies 38 are simultaneously inserted to positions on both sides of each outside layer-change line 28 of the coil 20 in a lamination thickness direction. The inside layer-change lines 26 are one example of a "crossover portion" and an "inside crossover portion" of the invention. The outside layer-change lines 28 are one example of the "crossover portion" and an "outside crossover portion" of the invention.

Figure 6:
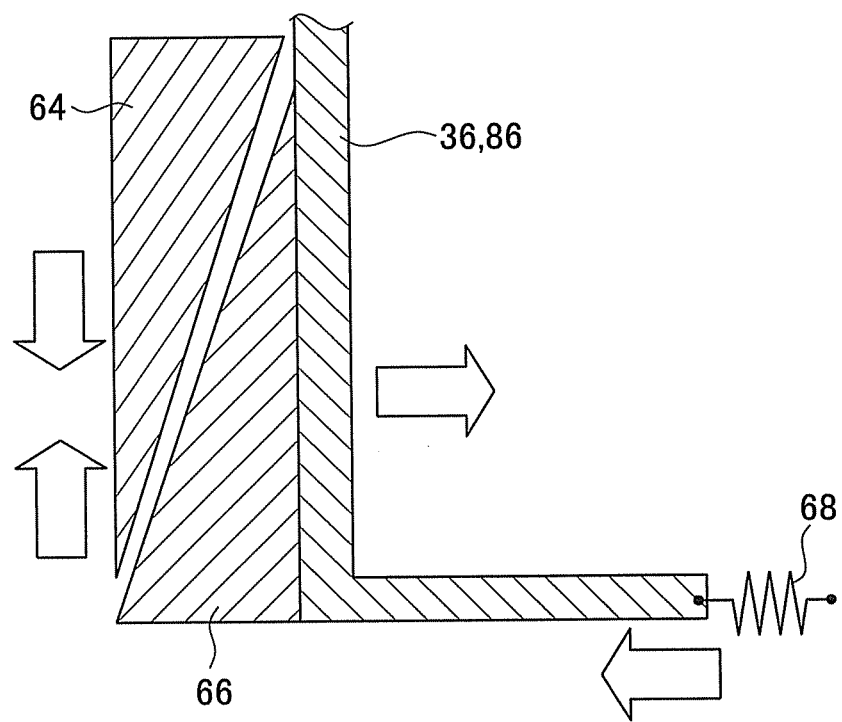
FIG. 6 is a view showing one example of a means for moving a slide base in sync with downward movement of an upper die.

As the means for synchronizing the movement of the slide bases 36 with the downward movement of the upper die 30, it is conceivable to use a means including a first member 64 and a second member 66 each having a wedge shape as shown in FIG. 6 and a return spring 68 (alternatively, an air pressure applying means). As shown in FIG. 6, the first member 64 and the second member 66 are placed in contact with each other through respective slant surfaces. The second member 66 is integral with the slide base 36. As the upper die 30 is moved down, pressing the first member 64 downward, the second member 66 is pushed by the first member 64 to move rightward in FIG. 6. Thus, the slide base 36 is moved toward the coil 20 against the urging force of the spring 68. The means shown in FIG. 6 requires no drive power. As an alternative to the means shown in FIG. 6, any means using drive power such as a servo mechanism may be used.

When the upper die 30 is further moved downward, the crank dies 38 are moved downward by the load applied from the upper die 30, thereby compressing the springs 40. Accordingly, the coil 20 is completely corrected as shown in FIG. 7. To be concrete, as the upper die 30 is moved downward, the coil 20 receives the downward load from the upper die 30. In FIG. 7, the springs 40 are omitted. At that time, simultaneously, a first end portion 70 and a second end portion 72 corresponding to both end portions of each outside layer-change line 28 in the longitudinal direction (a right-and-left direction in FIG. 7) are clamped and held by two crank dies 38 placed on both sides of each outside layer-change line 28 in the lamination thickness direction (the arrangement direction). Then, the upper die 30 is further moved downward, further applying a downward load to the coil 20, the coil 20 is corrected to reduce the lamination thickness. At that time, the crank dies 38 and the outside layer-change lines 28 are simultaneously moved downward while the load applied by the upper die 30 is added to the first end portions 70 and the second end portions 72 of the outside layer-change lines 28 via the crank dies 38.

Figure 10:
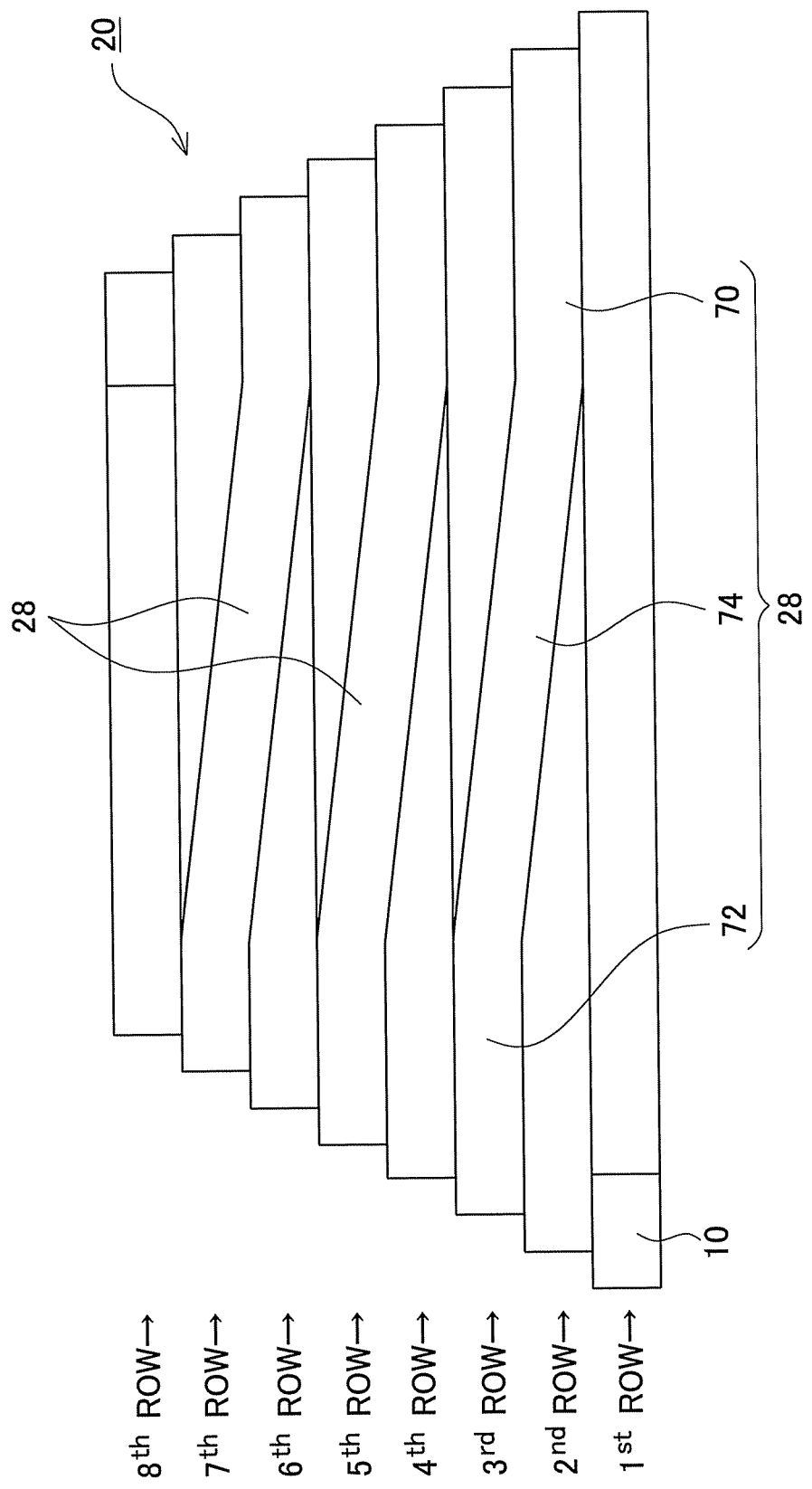
FIG. 10 is a front view of the corrected coil.

As shown in FIG. 7, the right-side crank dies 38 are respectively moved down to lower positions than the left-side crank dies 38. In this way, each outside layer-change line 28 is corrected by making the first end portion 70 and the second end portion 72 of each outside layer-change line 28 extend along different rows adjacent to each other so that a lane change portion 74 of each outside layer-change line 28 extends to connect adjacent rows. Specifically, as shown in FIG. 10 mentioned later, the shape of the outside layer-change line 28 is corrected by making the first end portion 70 of the outside layer-change line 28 extend along the second row and the second end portion 72 of the outside layer-change line 28 extend along the third row by shifting (lane changing) the flat conductor 10 from the second row to the third row through the lane change portion 74 of the outside layer-change line 28. The outside layer-change line 28 connecting the fourth row and the fifth row of the coil 20 and the outside layer-change line 28 connecting the sixth row and the seventh row of the coil 20 are also corrected. The lane change portions 74 are one example of an "intermediate portion" of the invention.

Figure 8:
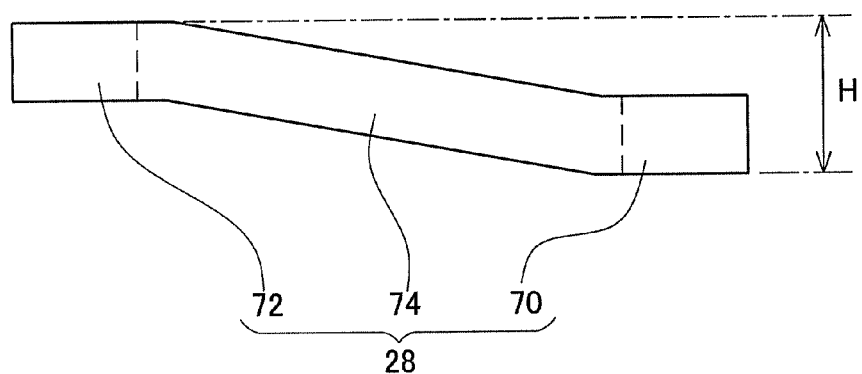
FIG. 8 is a view to explain the height of an outside layer-change line.

In the above manner, each outside layer-change line 28 is corrected to have such a height H in the lamination thickness direction as corresponding to double the thickness of the flat conductor 10 as shown in FIG. 8. Herein, the thickness of each crank die 38 is determined to be sufficiently large as to apply a load on the first end portions 70 and the second end portions 72 of the outside layer-change lines 28 in the lamination direction in expectation of an amount of the flat conductor 10 to be warped when the upper die 30 applies a load to the flat conductor 10. To be concrete, the thickness a1 of the thin wall portion 54 (see FIG. 5) is determined to be equal to the thickness of each of the first end portion 70 and the second end portion 72 of each outside layer-change line 28 when the flat conductor 10 is warped upon receiving the load applied from the upper die 30, and the thickness b1 of the thick wall portion 56 is determined to be double the thickness a1 of the thin wall portion 54 (the sizes are determined to establish the equation: (b1)=2×(a1)).

After the shape of the outside layer-change lines 28 is completely corrected as above, the upper die 30 is moved upward. At that time, the crank dies 38 are moved upward by the force of the springs 40 in sync with the upward movement of the upper die 30. The slide bases 36 are moved backward from the coil 20 in sync with the upward movement of the upper die 30, and the four right and left crank dies 38 are moved together backward from the coil 20. In the above manner, the coil 20 is completely corrected.

Figure 9:
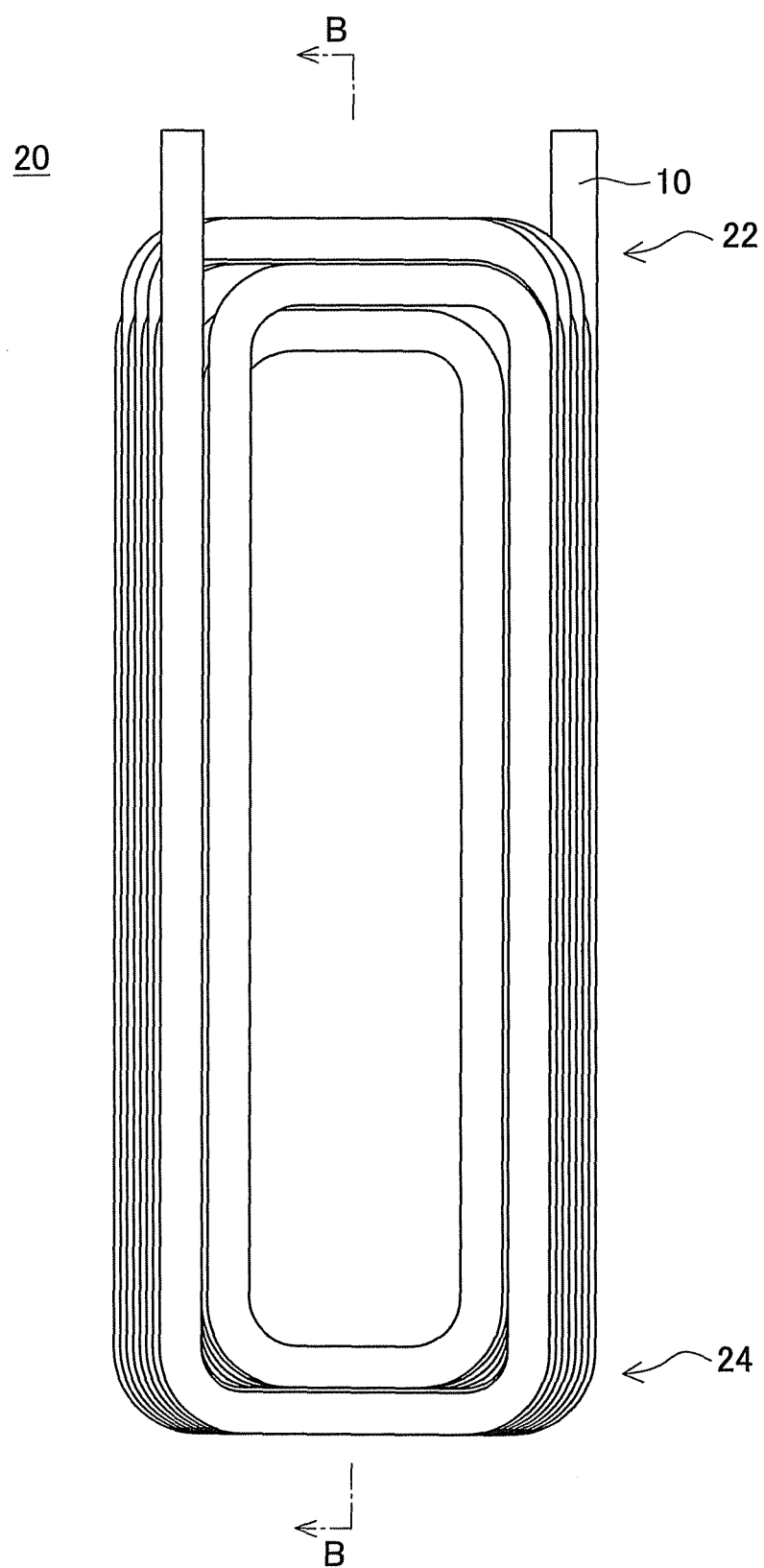
FIG. 9 is a top view of a corrected coil.
Figure 11:
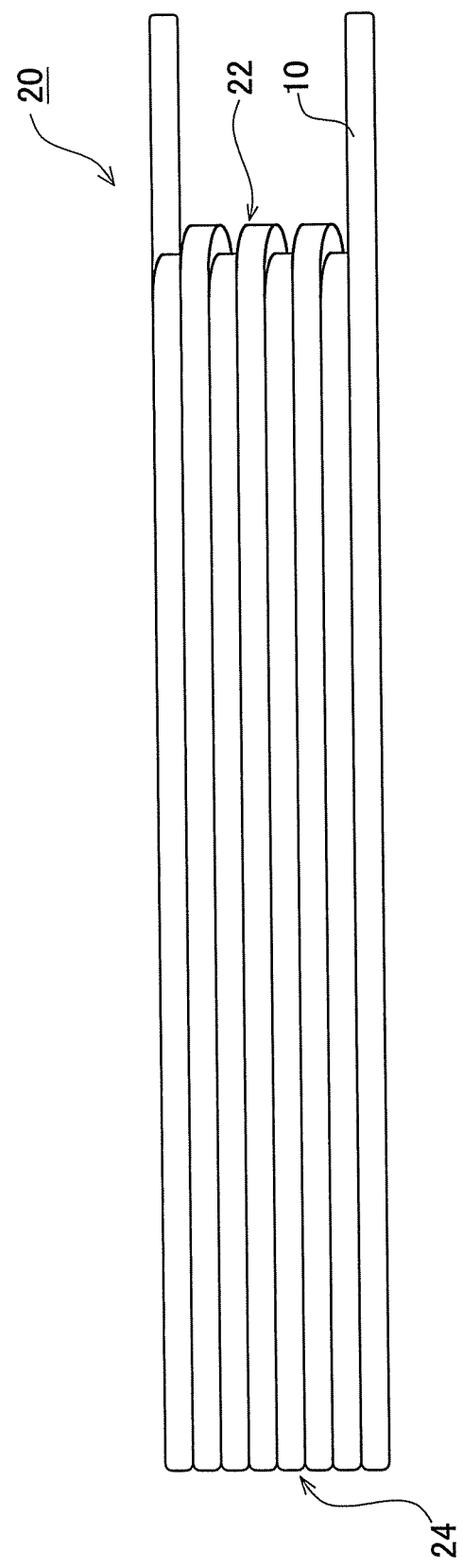
FIG. 11 is a side view of the corrected coil.

Herein, FIG. 9 shows a top view of the corrected coil 20. FIG. 10 shows a front view of the corrected coil 20. FIG. 11 shows a side view of the corrected coil 20. Since the coil 20 is corrected as above, the coil 20 is shaped with a lamination thickness reduced to an ideal thickness as shown in FIGS. 9-11.

As shown in FIGS. 9 and 10, in the corrected coil 20, each of first, third, fifth, and seventh rows is formed by winding the flat conductor 10 from an outside layer toward an inside layer, and each of second, fourth, sixth, and eighth rows is formed by winding the flat conductor 10 from an inside layer toward an outside layer. Regarding the second and third rows, the outside layer-change line 28 connects between the second row and the third row. In the corrected coil 20, the first end portion 70 of the outside layer-change line 28 extends along the second row and the second end portion 72 of the outside layer-change line 28 extends along the third row, and further the lane change portion 74 of the outside layer-change line 28 changes the lane between the second row and the third row. Remaining fourth and fifth rows and sixth and seventh rows are similarly configured.

Figure 12:
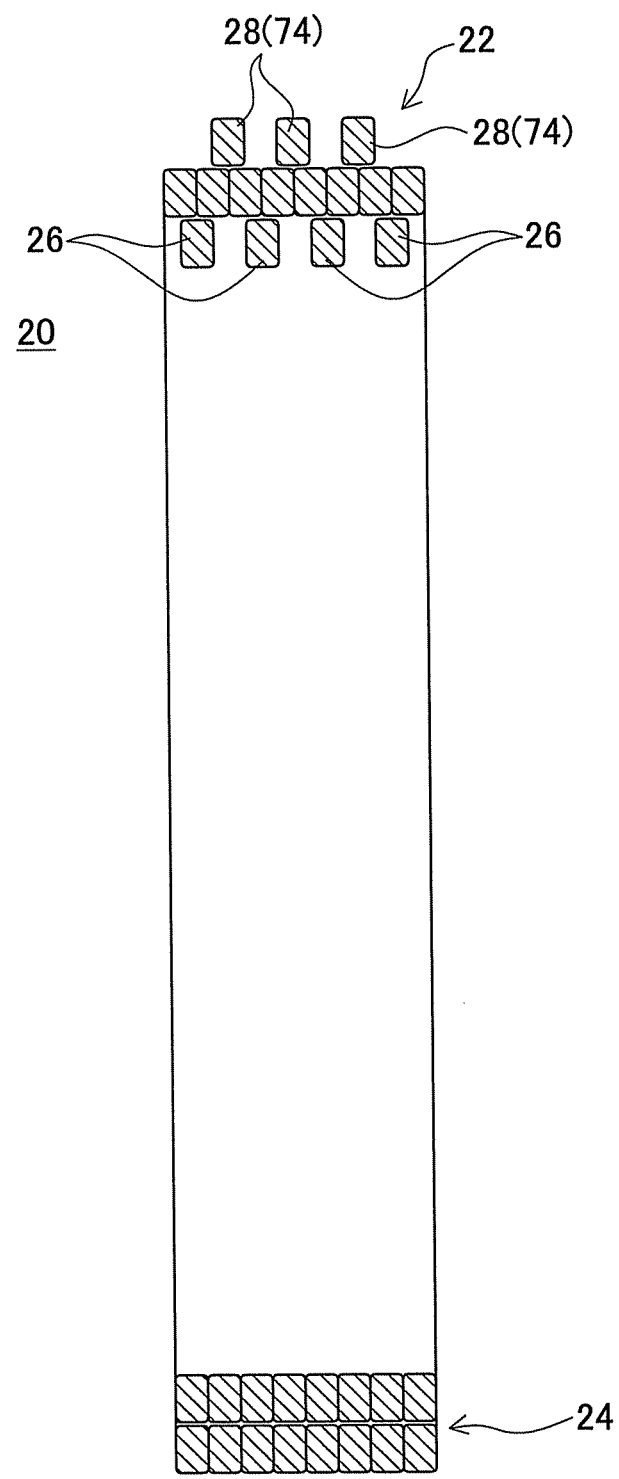
FIG. 12 is a cross sectional view taken along a line B-B in FIG. 9.

FIG. 12 is a cross sectional view taken along a line B-B in FIG. 9. As shown in FIG. 12, similarly, the outside layer-change lines 28 are formed outside of the coil end 22 on a lead side of the coil 20, that is, in a third layer, and the inside layer-change lines 26 are formed inside of the coil end 22 on the lead side of the coil 20, that is, in a first layer. On the other hand, at the coil end 24 of a non-lead side of the coil 20, only two layers are formed as with the other two sides of the coil 20 as shown in FIG. 12 and also no layer change line is provided.

Figure 13:
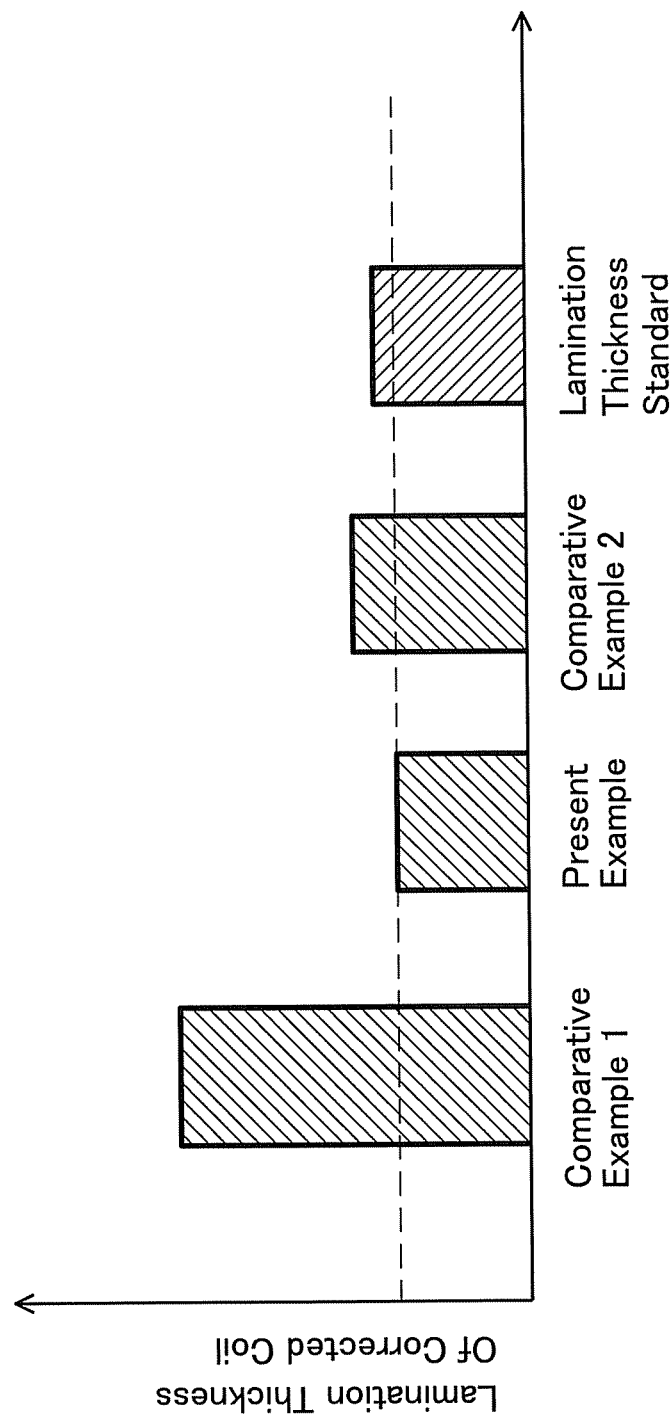
FIG. 13 is a view showing an advantageous effect of the first example.

According to the aforementioned method for correcting the coil 20 of the present example, evaluation results shown in FIG. 13 are obtained. In FIG. 13, Comparative example 1 shows an evaluation result obtained when a coil 20 is simply corrected between an upper die 30 and a lower die 32 without using crank dies 38. In FIG. 13, Comparative example 2 shows an evaluation result obtained when a coil 20 is simply corrected between an upper die 30 and a lower die 32 without using crank dies 38 and the thrust is doubled.

As shown in FIG. 13, according to the method for correcting the coil 20 of the present example, the lamination thickness of the corrected coil 20 is smaller than those of Comparative examples 1 and 2 and could be fall within the standard range. In contrast, according to the method of Comparative example 1, the lamination thickness of the coil 20 could not fall within the standard range. In Comparative example 2, the coil 20 remains including an inclination in the coil end direction on both sides, so that the lamination thickness of the coil 20 could not fall within the standard range. In Comparative example 2, particularly, the thrust is increased and therefore the insulation layer of the flat conductor 10 cannot be maintained, which is likely to deteriorate the insulation property.

Advantageous Effects of the Present Example

According to the present example, the upper die 30 applies a load to the first end portion 70 and the second end portion 72 of each outside layer-change line 28 through the crank dies 38, thereby correcting the coil 20 so that the first end portion 70 extends along the second row of the coil 20, the second end portion 72 extends along the third row of the coil 20, and the lane change portion 74 extends to shift from the second row to the third row of the coil 20. Accordingly, since the shape of the outside layer-change lines 28 is stable after the coil 20 is corrected, it is possible to reduce the inclination generated in the inside layer-change line 26 extending from the first row to the second row of the coil 20 and in the outside layer-change line 28 extending from the second row to the third row. Consequently, the lamination thickness of the coil 20 can be reduced and the coil 20 with an ideal lamination thickness can be obtained.

Since it is possible to intensively apply a load from the crank dies 38 to the outside layer-change lines 28 through the use of the load applied from the upper die 30, the load to be applied from the upper die 30 can be largely reduced. Therefore, the insulation layer coating the flat conductor 10 can be maintained even after correction of the coil 20, and thus an insulation property of the coil 20 can be ensured.

The crank dies 38 are disposed in the positions on both sides of each outside layer-change line 28 in the arrangement direction in sync with the movement of the upper die 30 that applies a load to the outside layer-change lines 28. Thus, the outside layer-change lines 28 can be corrected by use of the load applying motion of the upper die 30. This can achieve power saving in correcting the coil 20.

Furthermore, the thickness of the thin wall portion 54 of each crank die 38 is determined to be equal to the thickness of each of the first end portion 70 and the second end portion 72 defined under a load, and the thickness of the thick wall portion 56 of each crank die 38 is determined to be double the thickness of the thin wall portion 54. In this way, the thickness of the thin wall portion 54 and the thick wall portion 56 of each crank die 38 are determined in expectation of the warping amount of the flat conductor 10 obtained when the coil 20 receives the load. Accordingly, the crank dies 38 can reliably apply a load to the first end portions 70 and the second end portions 72.

Since the slide bases 36 are moved forward with respect to the coil 20, four crank dies 38 can be disposed at once in the positions on both sides the corresponding outside layer-change line 28 of the coil 20 in the lamination thickness direction.

Second Example

A second example will be explained below. In the following explanation, similar or identical parts to those in the first example are given the same reference signs and their explanations are omitted, and different points are mainly described.

(Structure of Correction Mechanism)

Figure 14:
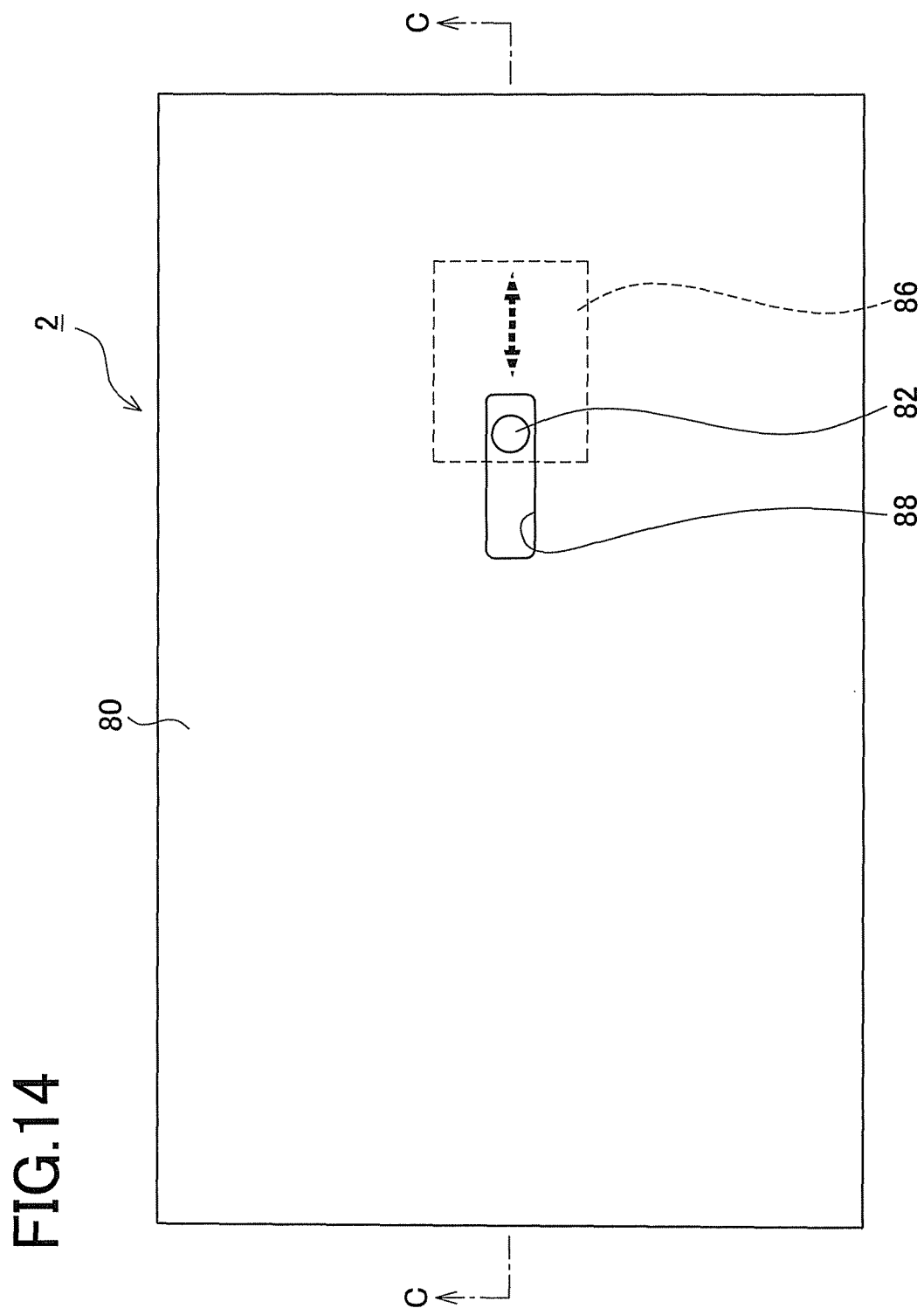
FIG. 14 is a top view (a partially transparent view) of a coil correction mechanism of a second example.
Figure 15:
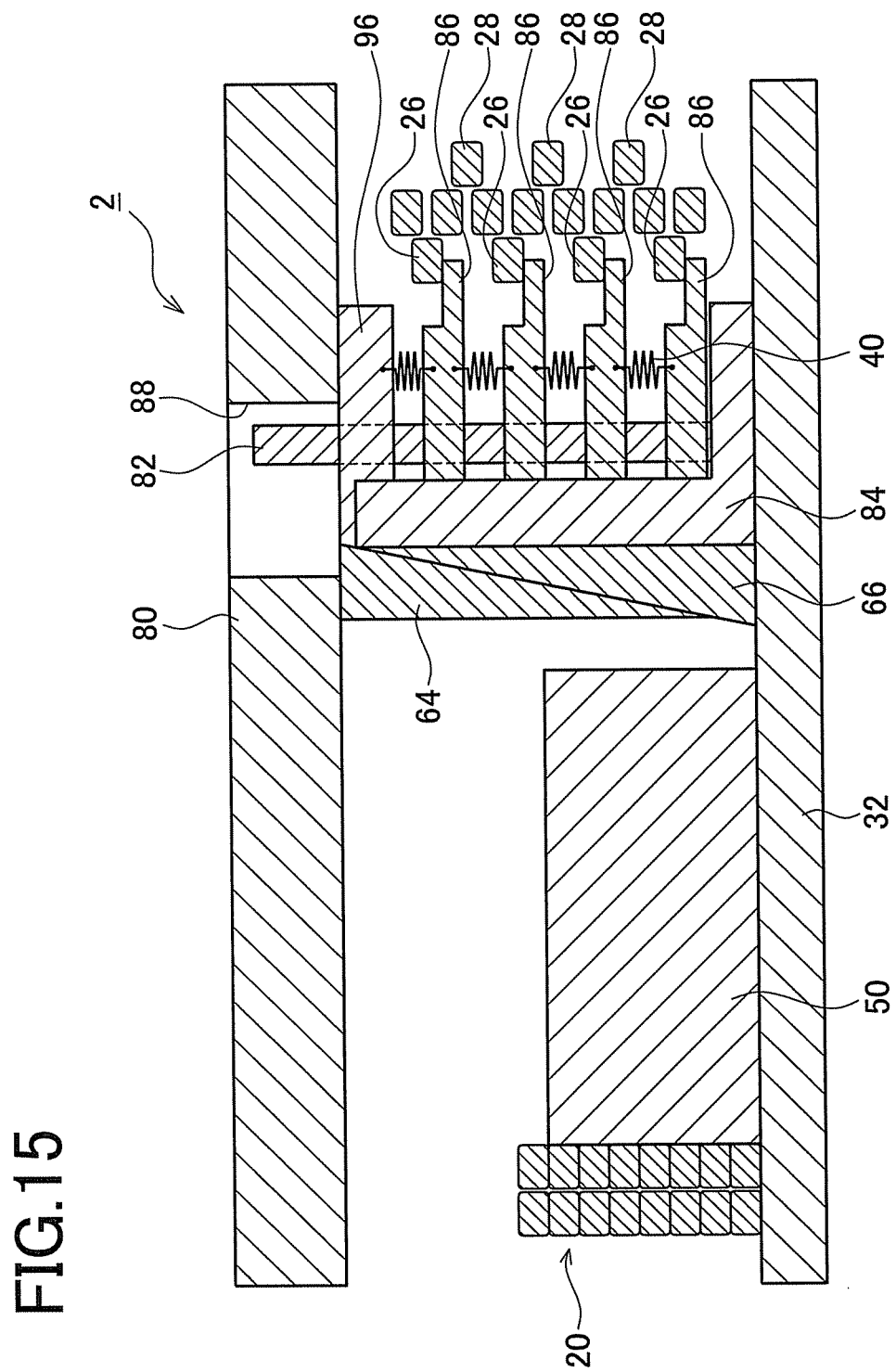
FIG. 15 is a cross sectional view taken along a line C-C in FIG. 14.

A structure of a coil correction mechanism to be used in the second example will be first explained. FIG. 14 is a top view (a partially transparent view) of the coil correction mechanism and FIG. 15 is a cross sectional view taken along a line C-C in FIG. 14. As shown in FIG. 15, the correction mechanism 2 includes an upper die 80, a lower die 32, a shaft 82, a slide base 84, crank dies 86, and springs 40.

The upper die 80 is placed in an uppermost position of the correction mechanism 2 as shown in FIG. 15. This upper die 80 has a rectangular shape when seen from above as shown in FIG. 14. This upper die 80 is provided with a recess 46 (see FIG. 4) at a center area in cross section in the short side direction. As shown in FIG. 14, furthermore, the upper die 80 is provided with a hole 88 opening to extend in a longitudinal direction of the upper die 80. The paired upper die 80 and lower die 32 are one example of a "coil correcting die" of the invention.

The slide base 84 is provided in a position under the upper die 80 as shown in FIG. 15 and has an L-shape as shown in FIG. 15 when the correction mechanism 2 is seen from side. The slide base 84 is moved forward and backward (a right-and-left direction in FIG. 15) with respect to the inside layer-change lines 26 of the coil 20 in sync with movement of the upper die 80 by a synchronizing means mentioned later. Accordingly, the crank dies 86 can be moved forward and backward with respect to the inside layer-change lines 26 of the coil 20 placed around the insert block 50 as described later. The slide base 84 is one example of a "movable part" of the invention.

The shaft 82 is integrally formed with the slide base 84 and an end of the shaft 82 close to the upper die 80 is inserted in the hole 88.

Figure 16:
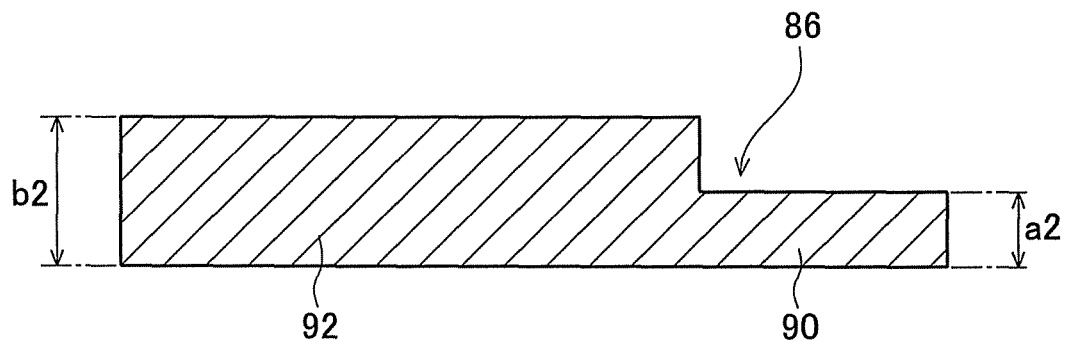
FIG. 16 is a view showing a crank die of the second example.
Figure 17:
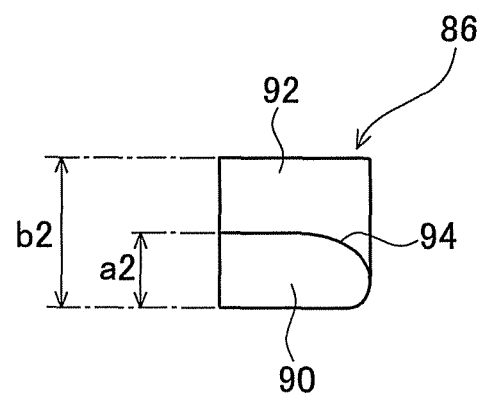
FIG. 17 is a view of the crank die of the second example seen from right in FIG. 16.

The crank dies 86 are provided two or more on the slide base 84 between the upper die 80 and the lower die 32 as shown in FIG. 15, which shows an example in which four crank dies are arranged. Each of the crank dies 86 includes a thin wall portion 90 having a small thickness and a thick wall portion 92 having a large thickness as shown in FIGS. 16 and 17, and is configured to allow the shaft 82 to pass through as shown in FIG. 15. These crank dies 86 are integral with the shaft 82 and the slide base 84 to be movable in the up-and-down direction (in which the upper die 80 and the lower die 32 are placed) in FIG. 15. Between the crank dies 86, springs 40 are provided to urge the crank dies 86 in the up-and-down direction in FIG. 15. Each crank die 86 is further provided with a rounded portion 94 having a circular curved shape at an end of the thin wall portion 90 in a forming direction of the inside layer-change lines 26 as shown in FIG. 17. The crank dies 86 are one example of a "crossover-portion correcting die" of the invention.

A spacer 96 is placed between the upper die 80 and the uppermost crank die 86 (closest to the upper die 80). The spacer 96 is designed with an appropriate thickness according to the specifications of the coil 20 to be formed. Accordingly, the magnitude of a load to be applied to the coil 20 can be adjusted. This enables the correction mechanism 2 to correct and shape the coil 20 having various specifications.

(Method for Correcting a Coil)

A method for correcting the coil 20 using the above configured correction mechanism 2 will be explained below. The coil 20 is first placed in the lower die 32 so that the insert block 50 of the lower die 32 is inserted inside the coil 20, and then the upper die 80 is moved downward toward the lower die 32. In sync with the downward movement of the upper die 80, the slide base 84 is moved toward the inside layer-change lines 26 of the coil 20. Thus, as shown in FIG. 15, the four crank dies 86 are together inserted in positions corresponding to both sides of the inside layer-change lines 26 of the coil 20 in the lamination thickness direction.

As the means for synchronizing the movement of the slide base 84 with the downward movement of the upper die 80, it is conceivable to use a means including the first member 64 and the second member 66 each having a wedge shape as shown in FIG. 6 and the return spring 68 (alternatively, an air pressure applying means). As an alternative to the means shown in FIG. 6, further, any means using drive power such as a servo mechanism may be used.

Figure 18:
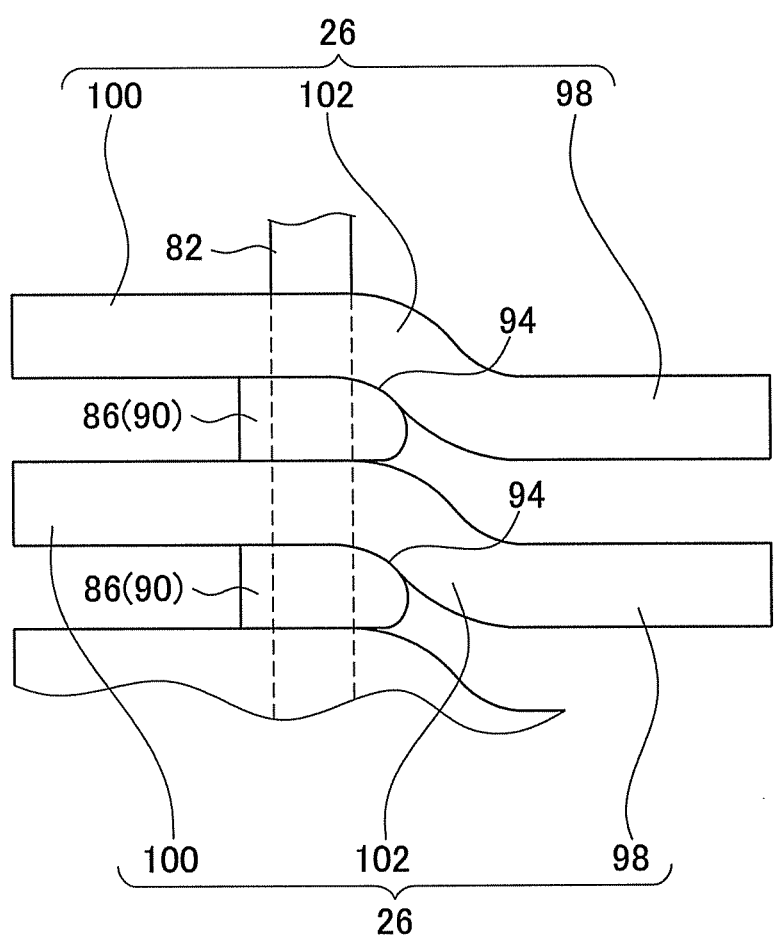
FIG. 18 is a view showing a crank die and an inside layer-change line when the crank shaping is completed.

When the upper die 80 is further moved downward, the crank dies 86 are moved downward by the load applied from the upper die 80, thereby compressing the springs 40. Accordingly, the coil 20 is completely corrected as shown in FIG. 18. Specifically, as the upper die 80 is moved downward, the coil 20 receives the downward load from the upper die 80. At that time, simultaneously, a lane change portion 102 between a first end portion 98 and a second end portion 100 corresponding to both end portions of each inside layer-change line 26 in the longitudinal direction (a right-and-left direction in FIG. 18) is clamped and held by two crank dies 86 arranged on both sides of each inside layer-change line 26 in the lamination direction (the arrangement direction).

As the upper die 80 is further moved downward, the coil 20 further receives the downward load from the upper die 80, thereby correcting the coil 20 so that its lamination thickness is reduced. At the same time, the load applied by the upper die 80 is given on the lane change portion 102 of each inside layer-change line 26 through the crank dies 86. The crank dies 86 and the inside layer-change lines 26 are moved downward, while the shape of the lane change portion 102 of each inside layer-change line 26 is corrected to a curved shape by the rounded portion 94 of each crank die 86. The lane change portion 102 is one example of the "intermediate portion" of the invention.

Figure 19:
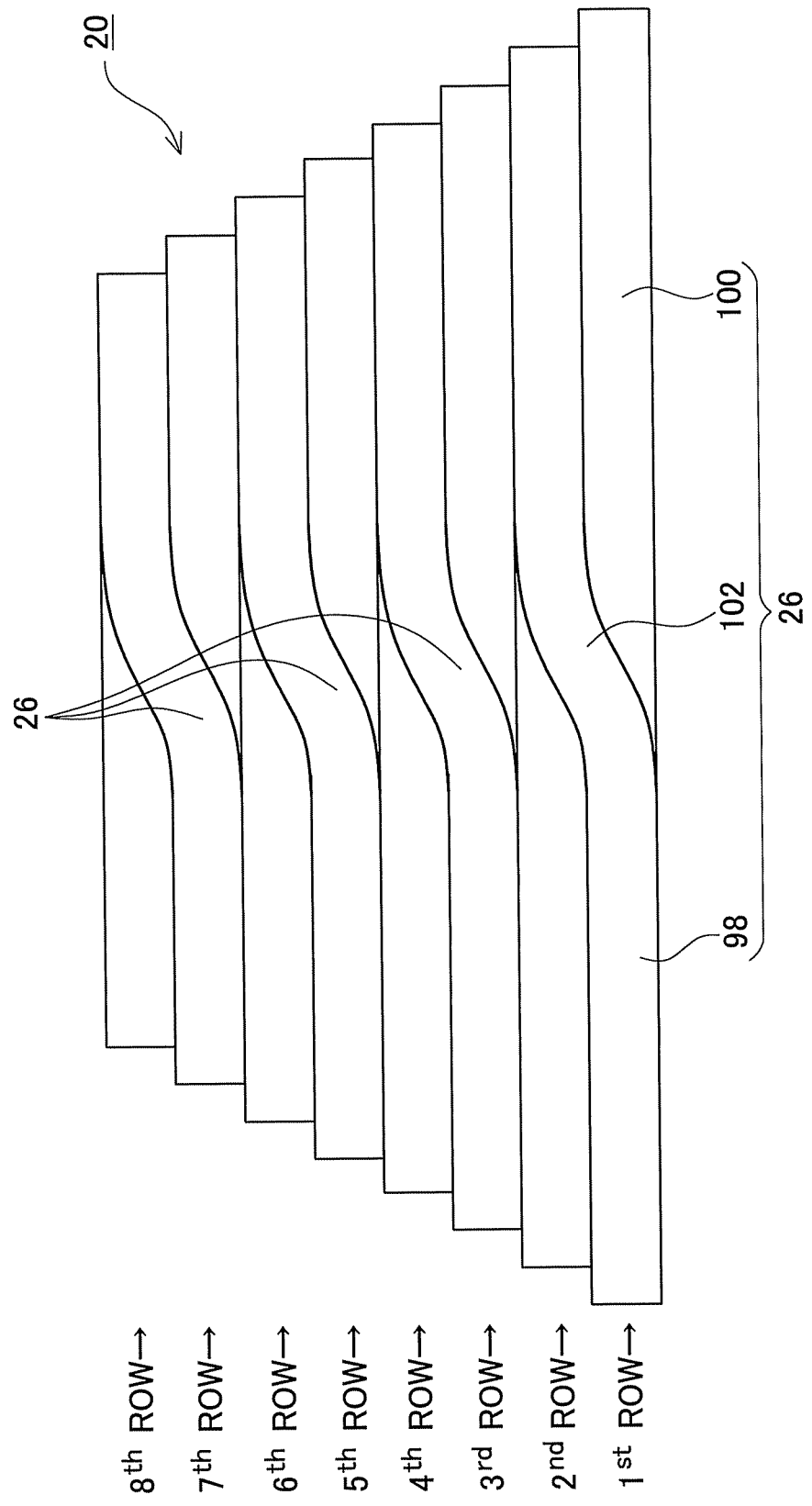
FIG. 19 is a view showing an inside layer-change line in the corrected coil.

The shape of the inside layer-change lines 26 is corrected as above so that the first end portion 98 and the second end portion 100 of each inside layer-change line 26 are shaped to extend along adjacent rows in the above manner, and the lane change portions 102 of the inside layer-change lines 26 bridge to the adjacent rows. As shown in FIG. 19, specifically, the shape of the inside layer-change line 26 is corrected by making the first end portion 98 of the inside layer-change line 26 extend along the first row and the second end portion 100 of the inside layer-change line 26 extend along the second row by shifting (lane changing) the flat conductor 10 from the first row to the second row through the lane change portion 102 of the inside layer-change line 26. It is to be noted that the inside layer-change line 26 connecting the third and fourth rows of the coil 20, the inside layer-change line 26 connecting the fifth and sixth rows of the coil 20, and the inside layer-change line 26 connecting the seventh and eighth rows of the coil 20 are similarly corrected. FIG. 19 is a schematic view of the coil 20 when seen from the side of the inner peripheral surface of the coil 20 to explain the state of the inside layer-change lines 26 of the corrected coil 20.

The inside layer-change lines 26 are corrected as above so that the height H in the lamination direction is double the thickness of the flat conductor 10 as in FIG. 8. Herein, the thickness of each crank die 86 is determined to be sufficiently large so as to apply a load to the lane change portions 102 of the inside layer-change lines 26 in the lamination thickness direction in expectation of an amount of the flat conductor 10 to be warped when the upper die 80 applies the load to the conductor. To be more specific, the thickness a2 of the thin wall portion 90 (see FIGS. 16 and 17) is determined to be equal to the thickness of the lane change portion 102 of each inside layer-change line 26 when the flat conductor 10 is warped upon receiving the load from the upper die 80, and the thickness b2 of the thick wall portion (see FIGS. 16 and 17) is determined to be double the thickness a2 of the thin wall portion 90 (the sizes are determined to establish the equation: (b2)=2×(a2)).

After the shape of the inside layer-change lines 26 is completely corrected as above, the upper die 80 is moved upward. At that time, the crank dies 86 are moved upward by the force of the springs 40 in sync with the upward movement of the upper die 80. The slide base 84 is moved backward from the inside layer-change lines 26 of the coil 20 in sync with the upward movement of the upper die 80. The four crank dies 86 are moved backward together from the inside layer-change lines 26 of the coil 20. In the above manner, the coil 20 is completely corrected.

By correcting the coil 20 in the above manner, the coil 20 is shaped with a lamination thickness reduced to an ideal thickness as shown in FIGS. 9, 11, and 19. Specifically, as shown in FIG. 19, the corrected coil 20 is configured such that the first end portion 98 of the inside layer-change line 26 extends along the first row and the second end portion 100 of the inside layer-change line 26 extends along the second row. In the corrected coil 20, furthermore, the lane change portion 102 of the inside layer-change line 26 extends for lane change from the first row to the second row. Remaining the third and fourth rows, the fifth and sixth rows, and the seventh and eighth rows are also configured in the similar manner to the above.

Advantageous Effects of the Present Example

According to the present example, the upper die 80 applies a load to the lane change portions 102 of the inside layer-change lines 26 through the crank dies 86, thereby correcting the coil 20 so that the first end portion 98 extends along the first row of the coil 20, the second end portion 100 extends along the second row of the coil 20, and the lane change portion 102 extends to shift from the first row to the second row of the coil 20. Accordingly, since the shape of the inside layer-change lines 26 is stable after the coil 20 is corrected, it is possible to reduce the inclination generated in the inside layer-change line 26 extending from the first row to the second row and in the outside layer-change line 28 extending from the second row to the third row. Consequently, the lamination thickness of the coil 20 can be reduced and hence the coil 20 with an ideal lamination thickness can be obtained.

Since it is possible to intensively apply a load from the crank dies 86 to the inside layer-change lines 26 through the use of the load applied from the upper die 80, the load to be applied from the upper die 80 can be largely reduced. Therefore, the insulation layer coating the flat conductor 10 can be maintained even after correction of the coil 20, and thus can an insulation property of the coil 20 can be ensured.

The crank dies 86 are disposed in the positions on both sides of each inside layer-change line 26 in the arrangement direction in sync with the movement of the upper die 80 that applies a load. Thus, the inside layer-change lines 26 can be corrected by use of the load applying motion of the upper die 80. This can achieve power saving in correcting the coil 20.

The thickness of the thin wall portion 90 of each crank die 86 is equal to the thickness of the lane change portion 102 defined under a load, and the thickness of the thick wall portion of each crank die 86 is double the thickness of the thin wall portion 90. As above, the thickness of the thin wall portion 90 and the thickness of the thick wall portion 92 of each crank die 86 are determined in expectation of the warping amount of the flat conductor 10 when the coil 20 receives the load. Accordingly, the crank dies 86 can reliably apply the load on the lane change portions 102.

If only the slide base 84 is moved forward with respect to the inside layer-change lines 26 of the coil 20, the four crank dies 86 can be disposed at once in the positions on both sides of the corresponding inside layer-change line 26 of the coil 20 in the lamination direction.

Third Example

A third example will be explained below. Similar or identical parts to those in the first and second examples are given the same reference signs and their explanations are omitted. Thus, the following explanation is made with a focus on different points from the first and second examples.

Figure 20:
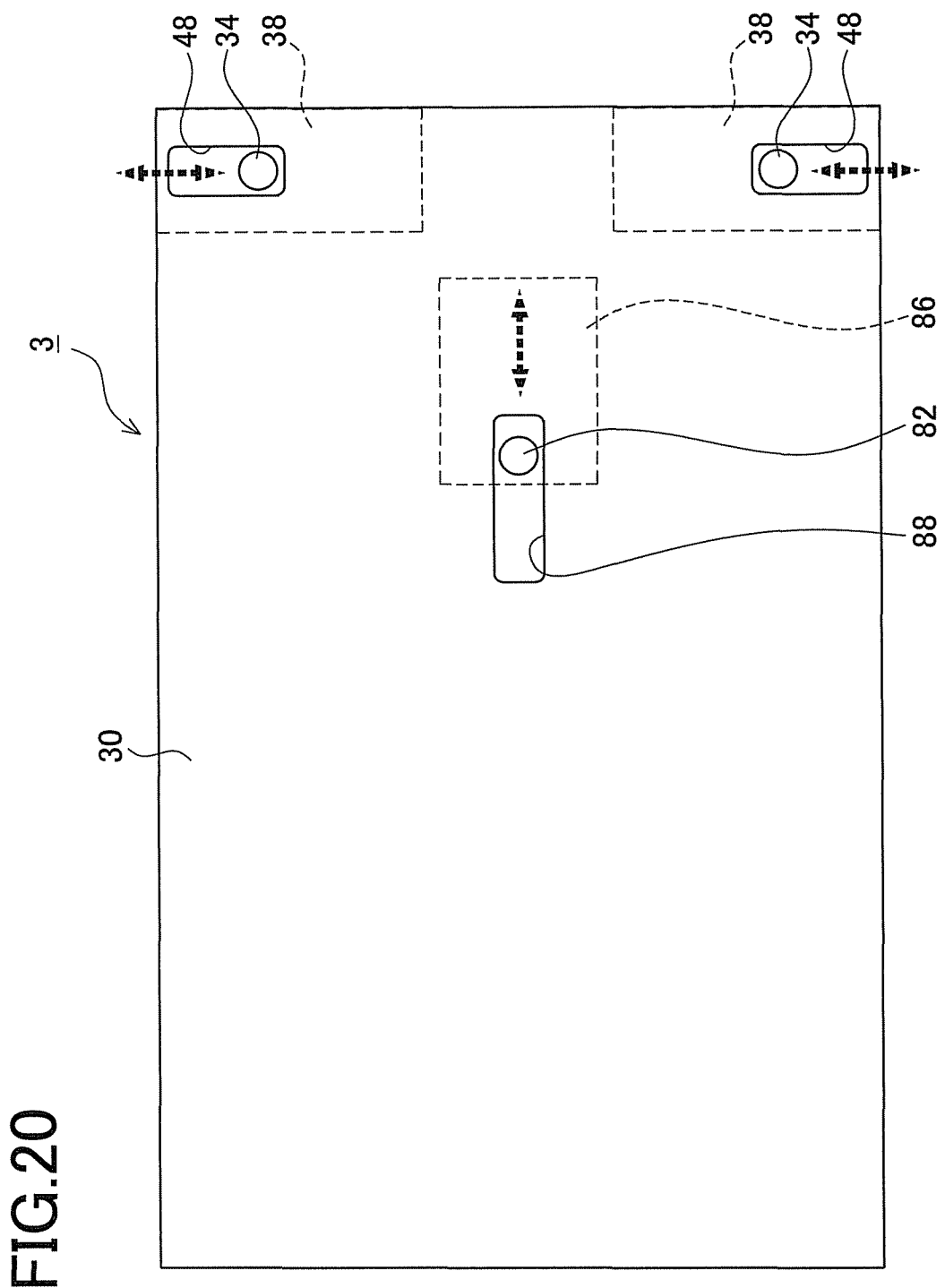
FIG. 20 is a top view (a partially transparent view) of a coil correction mechanism of a third example.
Figure 21:
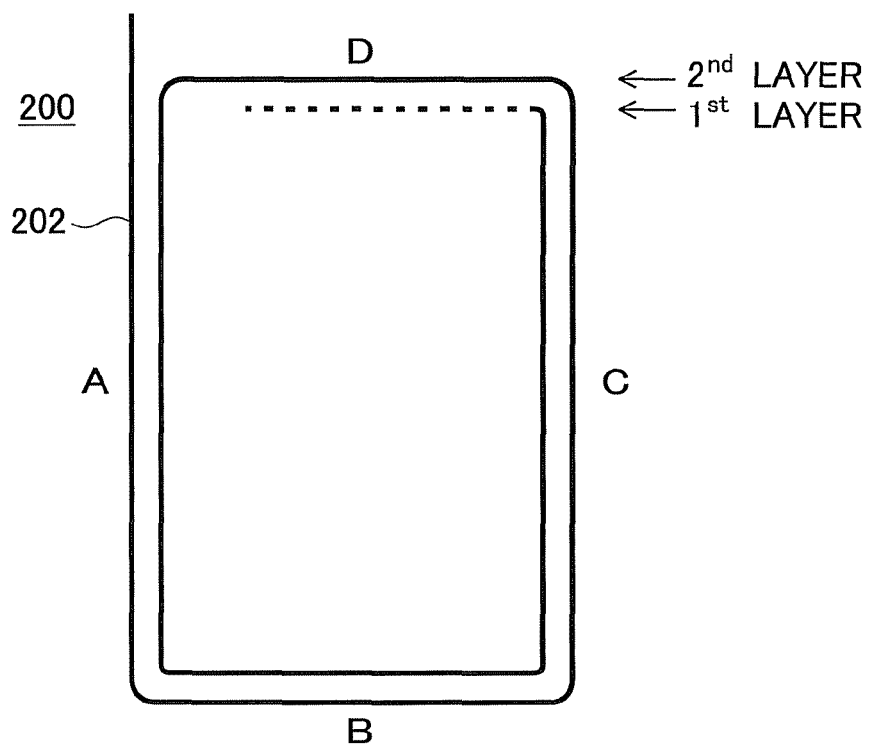
FIG. 21 is a schematic view showing the order of winding a first row in Patent Document 1.
Figure 22:
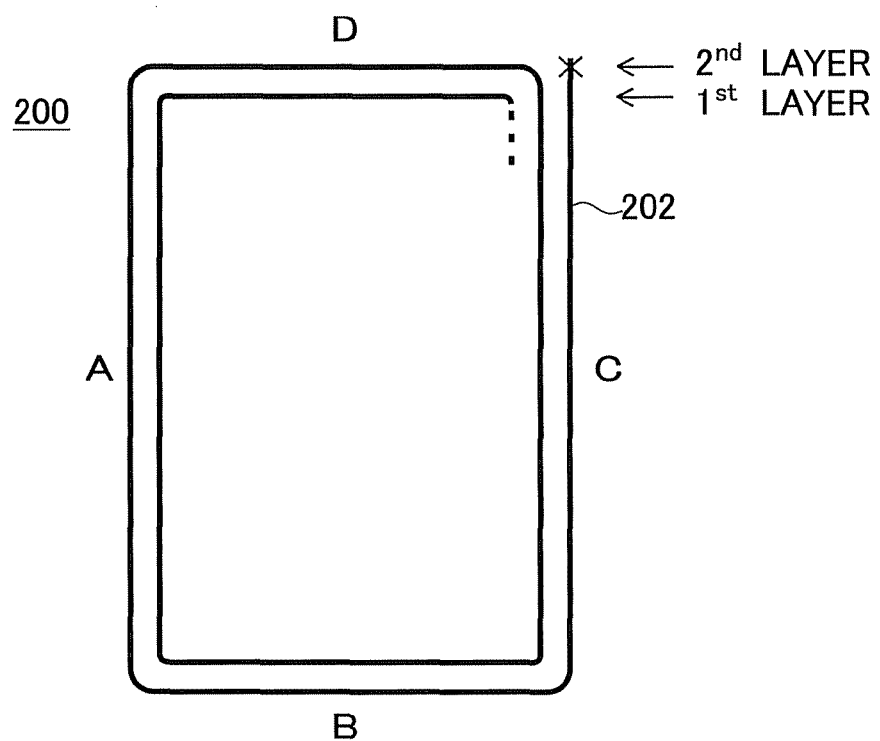
FIG. 22 is a schematic view showing the order of winding a second row in Patent Document 1.
Figure 23:
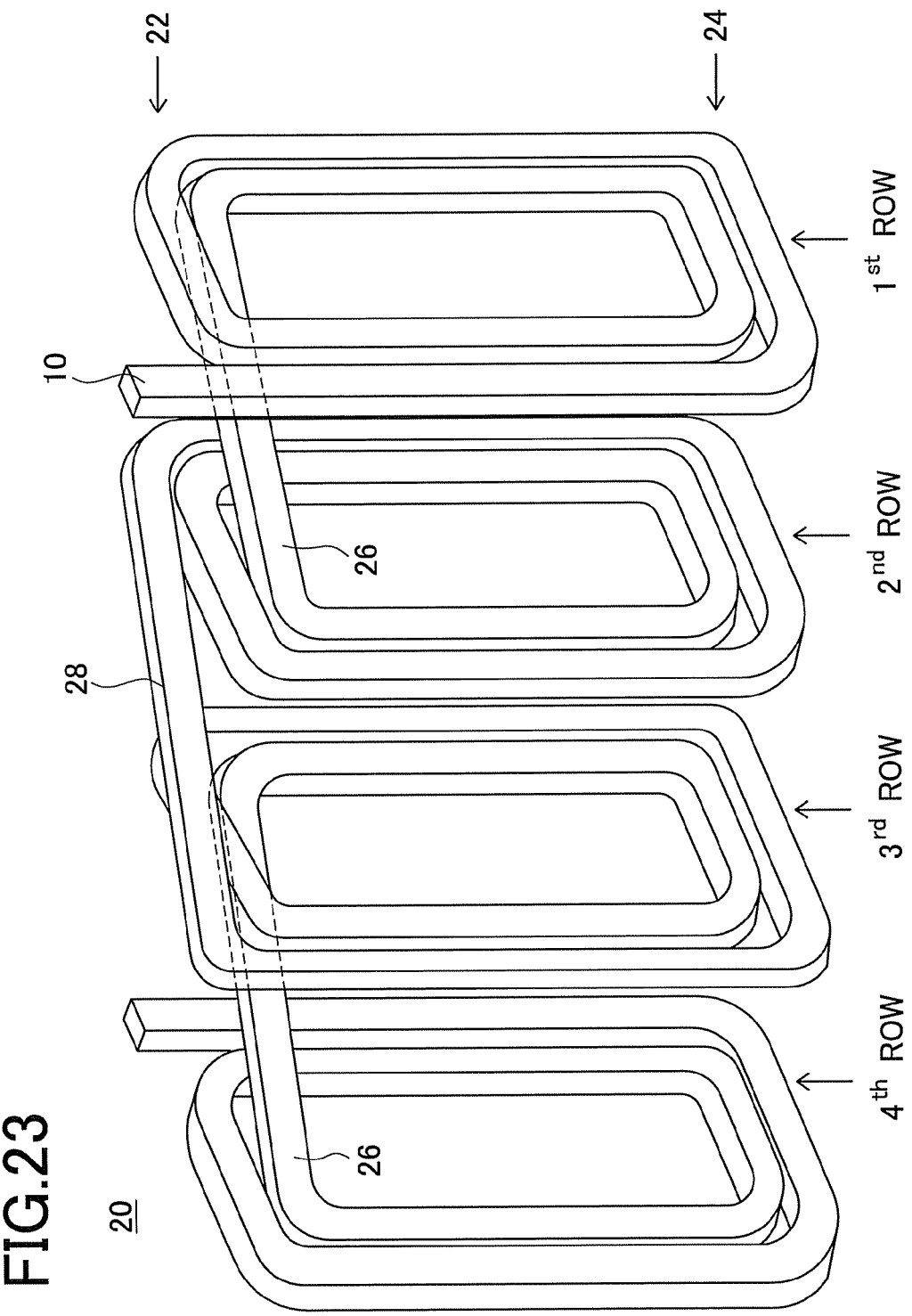
FIG. 23 is an exploded perspective view of a coil.

A correction mechanism 3 of the third example is configured by appropriately combining the structure of the correction mechanism 1 of the first example and the structure of the correction mechanism 2 of the second example as shown in FIG. 20. This correction mechanism 3 is configured to clamp the lane change portions 102 of the inside layer-change lines 26 by the crank dies 86 and clamp the first end portions 70 and the second end portions 72 of the outside layer-change lines 28 by the crank dies 38.

The upper die 30 is moved to apply a load to the lane change portions 102 of the inside layer-change lines 26 through the crank dies 86 to correct the coil 20 so that the first end portion 98 of the inside layer-change line 26 extends along the first row of the coil 20, the second end portion 100 of the inside layer-change line 26 extends along the second row of the coil 20, and the lane change portion 102 extends to shift from the first row to the second row. Furthermore, the upper die 30 is moved to apply a load to the first end portions 70 and the second end portions 72 of the outside layer-change lines 28 through the crank dies 38 to correct the coil 20 so that the first end portion 70 extends along the second row of the coil 20, the second end portion 72 extends along the third row of the coil 20, and the lane change portion 74 extends to shift from the second row to the third row.

According to the above correction mechanism 3, the shape of the inside layer-change lines 26 and the shape of the outside layer-change lines 28 are both stable even after the coil 20 is corrected. Consequently, the lamination thickness of the coil 20 can be further reduced and thus the coil 20 with a more ideal lamination thickness can be produced.

The above examples are mere examples, which do not restrict the invention. The present invention may be embodied in other specific forms without departing from the essential characteristics thereof.

REFERENCE SIGNS LIST

1 Correction mechanism
2 Correction mechanism
3 Correction mechanism
10 Flat conductor
20 Coil
22 Coil end
24 Coil end
26 Inside layer-change line
28 Outside layer-change line
30 Upper die
32 Lower die
36 Slide base
38 Crank die
54 Thin wall portion
56 Thick wall portion 70 First end portion
72 Second end portion
74 Lane change portion
80 Upper die
84 Slide base
86 Crank die
90 Thin wall portion
92 Thick wall portion
94 Rounded portion
98 First end portion
100 Second end portion
102 Lane change portion

The invention claimed is:

1. A method for correcting a coil made of a conductor wound in two layers that are an inside layer and an outside layer, comprising the steps of:
providing a coil that includes a first row formed of the conductor wound from the outside layer toward the inside layer, a second row formed of the conductor wound from the inside layer toward the outside layer, a third row of the conductor wound from the outside layer toward the inside layer, and crossover portions of the conductor connecting the adjacent rows;
providing a coil correcting die configured to apply a load to the coil in an arrangement direction of the first row, the second row, and the third row, to correct the coil;
clamping the crossover portions by crossover-portion correcting dies placed on both sides of each crossover portion in the arrangement direction; and
applying the load to the crossover portions by the coil correcting die through the crossover-portion correcting dies to make a first end portion and a second end portion of each crossover portion extend along the adjacent rows, and make an intermediate portion between the first end portion and the second end portion extend to shift to the adjacent rows.

2. The method for correcting a coil according to claim 1, wherein the crossover-portion correcting dies are disposed in positions on both sides of each crossover portion in the arrangement direction in sync with movement of the coil correcting die in applying the load.

3. The method for correcting a coil according to claim 2, wherein
each of the crossover-portion correcting dies includes a thick wall portion and a thin wall portion,
the thin wall portion has a thickness equal to a thickness of a part of each crossover portion to be applied with the load when the load is applied, and
the thick wall portion has a thickness double the thickness of the thin wall portion.

4. The method for correcting a coil according to claim 2, wherein
the crossover-portion correcting dies are mounted on a movable part that is movable forward and backward with respect to the crossover portions, and
when the movable part is moved forward with respect to the crossover portions, the crossover-portion correcting dies are disposed on both sides of each crossover portion in the arrangement direction.

5. The method for correcting a coil according to claim 2, wherein
the crossover portions include an outside crossover portion formed of the conductor connecting the second row and the third row, and
the crossover-portion correcting dies clamp the first end portion and the second end portion of the outside crossover portion.

6. The method for correcting a coil according to claim 2, wherein
the crossover portions include an inside crossover portion of the conductor connecting the first row and the second row, and
the crossover-portion correcting dies clamp an intermediate portion between the first end portion and the second end portion of the inside crossover portion.

7. The method for correcting a coil according to claim 2, wherein
the crossover portions include an inside crossover portion of the conductor connecting the first row and the second row and an outside crossover portion of the conductor connecting the second row and the third row, and
the crossover-portion correcting dies clamp an intermediate portion between the first end portion and the second end portion of the inside crossover portion and clamp the first end portion and the second end portion of the outside crossover portion.

8. The method for correcting a coil according to claim 1, wherein
each of the crossover-portion correcting dies includes a thick wall portion and a thin wall portion,
the thin wall portion has a thickness equal to a thickness of a part of each crossover portion to be applied with the load when the load is applied, and
the thick wall portion has a thickness double the thickness of the thin wall portion.

9. The method for correcting a coil according to claim 8, wherein
the crossover-portion correcting dies are mounted on a movable part that is movable forward and backward with respect to the crossover portions, and
when the movable part is moved forward with respect to the crossover portions, the crossover-portion correcting dies are disposed on both sides of each crossover portion in the arrangement direction.

10. The method for correcting a coil according to claim 8, wherein
the crossover portions include an outside crossover portion formed of the conductor connecting the second row and the third row, and
the crossover-portion correcting dies clamp the first end portion and the second end portion of the outside crossover portion.

11. The method for correcting a coil according to claim 8, wherein
the crossover portions include an inside crossover portion of the conductor connecting the first row and the second row, and
the crossover-portion correcting dies clamp an intermediate portion between the first end portion and the second end portion of the inside crossover portion.

12. The method for correcting a coil according to claim 8, wherein
the crossover portions include an inside crossover portion of the conductor connecting the first row and the second row and an outside crossover portion of the conductor connecting the second row and the third row, and
the crossover-portion correcting dies clamp an intermediate portion between the first end portion and the second end portion of the inside crossover portion and clamp the first end portion and the second end portion of the outside crossover portion.

13. The method for correcting a coil according to claim 1, wherein the crossover-portion correcting dies are mounted on a movable part that is movable forward and backward with respect to the crossover portions, and when the movable part is moved forward with respect to the crossover portions, the crossover-portion correcting dies are disposed on both sides of each crossover portion in the arrangement direction.

14. The method for correcting a coil according to claim 13, wherein the crossover portions include an outside crossover portion formed of the conductor connecting the second row and the third row, and the crossover-portion correcting dies clamp the first end portion and the second end portion of the outside crossover portion.

15. The method for correcting a coil according to claim 13, wherein the crossover portions include an inside crossover portion of the conductor connecting the first row and the second row, and the crossover-portion correcting dies clamp an intermediate portion between the first end portion and the second end portion of the inside crossover portion.

16. The method for correcting a coil according to claim 13, wherein the crossover portions include an inside crossover portion of the conductor connecting the first row and the second row and an outside crossover portion of the conductor connecting the second row and the third row, and the crossover-portion correcting dies clamp an intermediate portion between the first end portion and the second end portion of the inside crossover portion and clamp the first end portion and the second end portion of the outside crossover portion.

17. The method for correcting a coil according to claim 1, wherein the crossover portions include an outside crossover portion formed of the conductor connecting the second row and the third row, and the crossover-portion correcting dies clamp the first end portion and the second end portion of the outside crossover portion.

18. The method for correcting a coil according to claim 1, wherein the crossover portions include an inside crossover portion of the conductor connecting the first row and the second row, and the crossover-portion correcting dies clamp an intermediate portion between the first end portion and the second end portion of the inside crossover portion.

19. The method for correcting a coil according to claim 1, wherein the crossover portions include an inside crossover portion of the conductor connecting the first row and the second row and an outside crossover portion of the conductor connecting the second row and the third row, and the crossover-portion correcting dies clamp an intermediate portion between the first end portion and the second end portion of the inside crossover portion and clamp the first end portion and the second end portion of the outside crossover portion.

* * * * *